United States Patent
Li

(10) Patent No.: US 12,520,290 B2
(45) Date of Patent: Jan. 6, 2026

(54) COMMUNICATION METHOD AND APPARATUS

(71) Applicant: Huawei Technologies Co., Ltd., Shenzhen (CN)

(72) Inventor: Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 406 days.

(21) Appl. No.: 17/732,315

(22) Filed: Apr. 28, 2022

(65) Prior Publication Data
US 2022/0264572 A1    Aug. 18, 2022

Related U.S. Application Data

(63) Continuation of application No. PCT/CN2020/122427, filed on Oct. 21, 2020.

(30) Foreign Application Priority Data

Oct. 30, 2019    (CN) .......................... 201911046294.0

(51) Int. Cl.
*H04W 72/0453*    (2023.01)
*H04W 56/00*    (2009.01)

(52) U.S. Cl.
CPC ... *H04W 72/0453* (2013.01); *H04W 56/0015* (2013.01)

(58) Field of Classification Search
CPC .............. H04W 4/06; H04W 56/0015; H04W 72/0453; H04W 72/30
See application file for complete search history.

(56) References Cited

U.S. PATENT DOCUMENTS

| 8,843,118 B2 * | 9/2014 | Lu .......................... H04L 5/0064 455/414.1 |
| 11,051,259 B2 | 6/2021 | Tavildar et al. |
| 11,206,106 B2 | 12/2021 | He et al. |

(Continued)

FOREIGN PATENT DOCUMENTS

| CN | 101247315 A | 8/2008 |
| CN | 101606399 A | 12/2009 |

(Continued)

OTHER PUBLICATIONS

"Deliverable D3.3 RAN Logical Architecture and Interfaces for 5G-Xcast," Broadcast and Multicast Communication Enablers for the Fifth-Generation of Wireless Systems, Version v2.0, Feb. 28, 2019, 95 pages.

*Primary Examiner* — Shah M Rahman
(74) *Attorney, Agent, or Firm* — Slater Matsil, LLP

(57) ABSTRACT

This application provides a communication method and apparatus, and relates to the communication field, and in particular, to the multimedia broadcast multicast service (MBMS) field. The communication method includes: A main control unit receives a first data packet sent by a core network device. The main control unit sends first data included in the first data packet and first time information of the first data to a secondary unit. The secondary unit sends the first data to a terminal based on sending time indicated by the first time information. In embodiments of this application, the main control unit determines the sending time for sending the first data by the secondary unit to the terminal.

20 Claims, 19 Drawing Sheets

(56) References Cited

U.S. PATENT DOCUMENTS

| | | | |
|---|---|---|---|
| 2008/0101270 A1* | 5/2008 | Kekki | H04W 72/30 370/312 |
| 2008/0101334 A1* | 5/2008 | Bakker | H04W 72/30 370/350 |
| 2008/0311926 A1* | 12/2008 | Fischer | H04W 72/30 455/452.1 |
| 2011/0216787 A1 | 9/2011 | Ai et al. | |
| 2014/0362759 A1 | 12/2014 | Lu et al. | |
| 2015/0103728 A1* | 4/2015 | Kim | H04W 56/001 370/312 |
| 2018/0013808 A1* | 1/2018 | Petry | H04N 21/6131 |
| 2019/0053193 A1* | 2/2019 | Park | H04W 76/11 |
| 2019/0159086 A1* | 5/2019 | Xu | H04W 92/20 |
| 2019/0215214 A1* | 7/2019 | Kim | H04W 84/06 |
| 2020/0077287 A1* | 3/2020 | Prasad | H04W 72/30 |
| 2020/0205174 A1* | 6/2020 | Prasad | H04W 4/06 |
| 2020/0245403 A1 | 7/2020 | Gao et al. | |
| 2021/0235534 A1* | 7/2021 | Fiorani | H04L 1/08 |
| 2021/0352522 A1* | 11/2021 | Hwang | H04W 28/0278 |
| 2022/0279532 A1* | 9/2022 | Barac | H04W 72/27 |

FOREIGN PATENT DOCUMENTS

| | | | | |
|---|---|---|---|---|
| CN | 101651488 A | | 2/2010 | |
| CN | 101651510 A | | 2/2010 | |
| CN | 102131147 A | | 7/2011 | |
| CN | 103957590 A | | 7/2014 | |
| CN | 106612561 A | | 5/2017 | |
| CN | 108289007 A | | 7/2018 | |
| CN | 108353342 A | | 7/2018 | |
| CN | 111328149 A | * | 6/2020 | H04B 7/15 |
| CN | 113163440 A | * | 7/2021 | H04L 5/0048 |
| EP | 3908073 A1 | * | 11/2021 | H04L 1/0023 |
| WO | 2019072170 A1 | | 4/2019 | |
| WO | WO-2020088253 A1 | * | 5/2020 | H04W 72/56 |

* cited by examiner

COMMUNICATION METHOD AND APPARATUS

CROSS-REFERENCE TO RELATED APPLICATIONS

This application is a continuation of International Application No. PCT/CN2020/122427, filed on Oct. 21, 2020, which claims priority to Chinese Patent Application No. 201911046294.0, filed on Oct. 30, 2019. The disclosures of the aforementioned applications are hereby incorporated by reference in their entireties.

TECHNICAL FIELD

This application relates to the field of communication technologies, and in particular, to a communication method and apparatus.

BACKGROUND

In an existing multimedia broadcast multicast service (MBMS) synchronization process, in a data source of an MBMS, an SYNC protocol entity adds a time stamp to each data packet. Cells (or base stations) map each data packet to a corresponding scheduling periodicity based on the time stamp of the data packet. For each data packet, a plurality of cells transmit the data packet in the scheduling periodicity corresponding to the data packet, so that the plurality of cells simultaneously send a broadcast service, and send a same data packet. However, in this manner, SYNC protocol entities need to be added to the data source of the MBMS and the base stations, the data source of the MBMS adds the time stamp to the data packet, and the base stations (or the cells in the base stations) deduce same transmission time based on the time stamp. Therefore, the process of implementing MBMS synchronization is complex.

SUMMARY

This application provides a communication method and apparatus, to implement MBMS synchronization and simplify an MBMS synchronization process.

According to a first aspect, an embodiment of this application provides a communication method. The method includes: A main control unit receives a first data packet from a core network device. The first data packet includes first data. After determining sending time of the first data, the main control unit sends the first data and first time information to at least one secondary unit. The first time information is used to indicate the sending time of the first data to the at least one secondary unit.

Based on the foregoing solution, the main control unit determines the sending time of the first data, to avoid adding a time stamp to the data packet. Therefore, no SYNC protocol entity needs to be added to a data source and base stations, so that a synchronous transmission process is simplified. Further, the first data may be a part of data in the first data packet. Therefore, compared with the time stamp added by the data source to the first data packet, the first time information of the first data has smaller a granularity, and is more accurate.

In a possible implementation, that the main control unit sends the first data to at least one secondary unit includes: The main control unit sends a second data packet to the at least one secondary unit. The second data packet includes the first data, and the second data packet is obtained by processing the first data packet.

Based on the foregoing solution, the main control unit transmits the second data packet to the secondary unit, and the second data packet may be a data unit obtained through encapsulation at each protocol layer corresponding to each protocol. Therefore, this application has a wider application scope, and a transmission manner is more flexible.

In a possible implementation, the method further includes: The main control unit sends first configuration information to the at least one secondary unit. The first configuration information is used to configure a first time domain resource, and the sending time of the first data is included in the first time domain resource.

Based on the foregoing solution, the main control unit configures the first configuration information for the secondary unit, to ensure that the secondary unit has, at the first time information configured by the main control unit, a time domain resource used to transmit the first data, and ensure synchronous transmission of the first data.

In a possible implementation, the first configuration information further includes second time information, and the second time information is used to indicate release time of a first frequency domain resource corresponding to the first time domain resource.

Based on the foregoing solution, the main control unit indicates, by using the first configuration information, the secondary unit to release a time-frequency resource configured based on the first configuration information, to avoid a resource waste caused because the secondary unit still occupies the time-frequency resource when there is no data to be sent.

In a possible implementation, the second data packet includes a PDCP PDU (packet data convergence protocol protocol data unit) or at least one MAC PDU (medium access control protocol data unit).

In a possible implementation, that the main control unit sends the first data and first time information to at least one secondary unit includes: The main control unit may further send, to the at least one secondary unit, grant information including second frequency domain resource information. The second frequency domain resource information is used to indicate a frequency domain resource corresponding to the first data, so that the secondary unit adjusts the first frequency domain resource based on the second frequency domain resource information.

Based on the foregoing solution, the main control unit configures the grant information for the secondary unit, so that the secondary unit can adjust a reserved time-frequency resource in time, to avoid a resource waste caused by using a large frequency domain resource to transmit small data.

In a possible implementation, if the second data packet includes the PDCP PDU, the grant information includes at least one piece of second frequency domain resource information, the at least one piece of second frequency domain resource information corresponds to at least one MAC PDU, and the at least one MAC PDU corresponds to the PDCP PDU; or if the second data packet includes the at least one MAC PDU, second frequency domain resource information included in grant information corresponding to each of the at least one MAC PDU corresponds to the MAC PDU.

In a possible implementation, the method further includes: The main control unit sends concatenation indication information to the at least one secondary unit. The concatenation indication information is used to indicate that the second data packet and at least one fourth data packet are concatenated, the at least one fourth data packet includes at least one piece of second data, and the sending time of the first data is the same as sending time of the at least one piece of second data.

Based on the foregoing solution, the main control unit indicates, by using the concatenation indication information, the secondary unit to concatenate data having same sending time, to avoid a procedure of generating a plurality of transport blocks and a resource waste caused in the procedure.

In a possible implementation, if the second data packet includes the PDCP PDU, the first time information is used to indicate sending time of the first MAC PDU corresponding to the PDCP PDU; or if the second data packet includes the at least one MAC PDU, the first time information is used to indicate sending time of the at least one MAC PDU.

Based on the foregoing solution, if the second data packet includes the PDCP PDU, because the PDCP PDU needs to be segmented, that is, the secondary unit sends data in the PDCP PDU by using a plurality of first time domain resources, the first time information that is of the PDCP PDU and that is sent by the main control unit is used to indicate sending time at which the secondary unit sends a MAC PDU corresponding to the first segment of the PDCP PDU, and a subsequent segment of the PDCP PDU is sent by using a reserved time domain resource after the first time domain resource corresponding to the first time information, to avoid a signaling resource waste caused because the main control unit sends a plurality of pieces of time information to the secondary unit. If the second data packet includes the at least one MAC PDU, because the MAC PDU does not need to be segmented any more after being transmitted to the secondary unit, each MAC PDU may correspond to one piece of first time information, and the first time information may indicate sending time of the MAC PDU. Further, if sending time of a plurality of MAC PDUs is all the same, the plurality of MAC PDUs may alternatively correspond to one piece of first time information, and the first time information may indicate the sending time of the plurality of MAC PDUs, so that signaling overheads are reduced.

In a possible implementation, the first time information includes a frame number of a radio frame and a slot number; or the first time information is a number of the first time domain resource.

According to a second aspect, this application provides a communication method. The method includes: A secondary unit receives first data and first time information that are sent by a main control unit. The first time information is used to indicate sending time of the first data; and sends the first data to a terminal at the sending time.

In a possible implementation, that a secondary unit receives a first data packet sent by a main control unit includes: The secondary unit receives a second data packet sent by the main control unit. The second data packet includes the first data. The second data packet is obtained by processing the first data packet from a core network device by the main control unit.

In a possible implementation, the method further includes: The secondary unit receives first configuration information sent by the main control unit. The first configuration information is used to configure a first time domain resource, and the sending time of the first data is included in the first time domain resource.

In a possible implementation, the first configuration information further includes second time information, and the second time information is used to indicate release time of a first frequency domain resource corresponding to the first time domain resource.

In a possible implementation, the second data packet includes a PDCP PDU or at least one MAC PDU.

In a possible implementation, the receiving a first data packet sent by a main control unit includes: The secondary unit receives grant information that is sent by the main control unit and that includes second frequency domain resource information. The second frequency domain resource information is used to indicate a frequency domain resource corresponding to the first data.

In a possible implementation, if the second data packet includes the PDCP PDU, the grant information includes at least one piece of second frequency domain resource information, the at least one piece of second frequency domain resource information corresponds to at least one MAC PDU, and the at least one MAC PDU corresponds to the PDCP PDU; or if the second data packet includes the at least one MAC PDU, second frequency domain resource information included in grant information corresponding to each of the at least one MAC PDU corresponds to the MAC PDU.

In a possible implementation, the method further includes: The secondary unit receives concatenation indication information sent by the main control unit. The concatenation indication information is used to indicate that the second data packet and at least one fourth data packet are concatenated, the at least one fourth data packet includes at least one piece of second data, and the sending time of the first data is the same as sending time of the at least one piece of second data. After concatenating the second data packet and the at least one fourth data packet according to the concatenation indication, the secondary unit sends concatenated data to the terminal by using the first time domain resource corresponding to the sending time.

In a possible implementation, if the second data packet includes the PDCP PDU, the first time information is used to indicate sending time of the first MAC PDU corresponding to the PDCP PDU; or if the second data packet includes the at least one MAC PDU, the first time information is used to indicate sending time of the at least one MAC PDU.

In a possible implementation, the first time information includes a frame number of a radio frame and a slot number; or the first time information is a number of the first time-frequency resource.

According to a third aspect, an embodiment of this application provides a communication method. The method includes: A main control unit receives first data packets from a core network device. The first data packets include first data. After determining the first time information of the first data packets, the main control unit sends indication information to at least one secondary unit. The indication information is used to indicate a correspondence between numbers of the first data packets and the first time information of the first data packets, and the first time information is used to indicate sending time of the first data to the at least one secondary unit.

In a possible implementation, the method further includes: The main control unit sends first configuration information to the at least one secondary unit. The first configuration information is used to configure a first time domain resource, and sending time of the first data packet is included in the first time domain resource.

In a possible implementation, the first configuration information further includes second time information, and the second time information is used to indicate release time of a first frequency domain resource corresponding to the first time domain resource.

In a possible implementation, that the main control unit sends indication information to at least one secondary unit includes: The main control unit sends, to the at least one secondary unit, grant information including second frequency domain resource information. The second frequency domain resource information is used to indicate a frequency domain resource corresponding to the first data.

In a possible implementation, the main control unit sends concatenation indication information to the at least one secondary unit. The concatenation indication information is used to indicate that the first data packet and at least one fourth data packet are concatenated, and the sending time of the first data packet is the same as sending time of the at least one fourth data packet.

In a possible implementation, the first time information is used to indicate sending time at which the first MAC PDU corresponding to the first data packet is sent.

In a possible implementation, the first time information includes a frame number of a radio frame and a slot number; or the first time information is a number of the first time-frequency resource.

According to a fourth aspect, an embodiment of this application provides a communication method. The method includes: A secondary unit receives first data packets from a core network device and indication information that is sent by a main control unit. The first data packets include first data, the indication information is used to indicate a correspondence between numbers of the first data packets and first time information of the first data packets, and the first time information is used to indicate sending time of the first data. The secondary unit sends the first data to a terminal at the sending time.

In a possible implementation, the method further includes: The secondary unit receives first configuration information sent by the main control unit. The first configuration information is used to configure a first time domain resource, and the sending time of the first data is included in the first time domain resource.

In a possible implementation, the first configuration information further includes second time information, and the second time information is used to indicate release time of a first frequency domain resource corresponding to the first time domain resource.

In a possible implementation, receiving the correspondence sent by the main control unit includes: The secondary unit receives grant information that is sent by the main control unit and that includes second frequency domain resource information. The second frequency domain resource information is used to indicate a frequency domain resource corresponding to the first data.

In a possible implementation, the method further includes: The secondary unit receives concatenation indication information sent by the main control unit, where the concatenation indication information is used to indicate that the first data packet and at least one fourth data packet are concatenated, the at least one fourth data packet includes at least one piece of second data, and the sending time of the first data is the same as sending time of the at least one piece of second data. After concatenating the first data packet and the at least one fourth data packet according to the concatenation indication, the secondary unit sends concatenated data to the terminal by using the first time domain resource corresponding to the sending time.

In a possible implementation, the first time information is used to indicate sending time of the first MAC PDU corresponding to the first data packet.

In a possible implementation, the first time information includes a frame number of a radio frame and a slot number; or the first time information is a number of the first time-frequency resource.

According to a fifth aspect, a communication apparatus is provided. The apparatus provided in this application has a function of implementing behavior of the main control unit or the secondary unit in the aspects of the foregoing methods, and includes a corresponding means configured to perform the steps or the functions described in the aspects of the foregoing methods. The steps or the functions may be implemented by using software, hardware (for example, a circuit), or a combination of the hardware and the software.

In a possible design, the apparatus includes one or more processors and a communication unit. The one or more processors are configured to support the apparatus in performing corresponding functions of the centralized unit in the foregoing methods, for example, determining the first time information. The communication unit is configured to support the apparatus in communicating with another device, to implement a receiving function and/or a sending function, for example, receiving the first data packet from the core network device, or sending the first data and the first time information to the at least one secondary unit.

Optionally, the apparatus may further include one or more memories. The memory is configured to be coupled to the processor, and the memory stores program instructions and/or data that are/is necessary for a network device. The one or more memories may be integrated with the processor, or may be disposed separately from the processor. This is not limited in this application.

The apparatus may be a base station, a gNB, a gNB-CU, a gNB-CU+gNB-DU, a TRP, or the like. The communication unit may be a transceiver or a transceiver circuit. Optionally, the transceiver may alternatively be an input/output circuit or an interface.

The apparatus may alternatively be a communication chip. The communication unit may be an input/output circuit or an interface of the communication chip.

In another possible design, the apparatus includes a transceiver, a processor, and a memory. The processor is configured to control the transceiver or an input/output circuit to send and receive a signal, and the memory is configured to store a computer program. The processor is configured to run the computer program in the memory, to enable the apparatus to perform the method completed by the main control unit in any possible implementation in the first aspect or the third aspect.

In a possible design, the apparatus includes one or more processors and a communication unit. The one or more processors are configured to support the apparatus in performing corresponding functions of the secondary unit in the foregoing methods. The communication unit is configured to support the apparatus in communicating with another device, to implement a receiving function and/or a sending function, for example, receiving the first data and the first time information that are sent by the main control unit, or sending the first data to the terminal at the sending time.

Optionally, the apparatus may further include one or more memories. The memory is configured to be coupled to the processor, and the memory stores program instructions and/or data that are/is necessary for a network device. The one or more memories may be integrated with the processor, or may be disposed separately from the processor. This is not limited in this application.

The apparatus may be a base station. Optionally, the apparatus may further include one or more memories. The memory is configured to be coupled to the processor, and the memory stores program instructions and/or data that are/is necessary for a network device. The one or more memories may be integrated with the processor, or may be disposed separately from the processor. This is not limited in this application.

The apparatus may be a base station, a gNB (next generation NodeB), a gNB-CU (centralized unit), a gNB-DU (distributed unit), the gNB-CU+gNB-DU, a TRP, or the like. The communication unit may be a transceiver or a transceiver circuit. Optionally, the transceiver may alternatively be an input/output circuit or an interface.

The apparatus may alternatively be a communication chip. The communication unit may be an input/output circuit or an interface of the communication chip.

In another possible design, the apparatus includes a transceiver, a processor, and a memory. The processor is configured to control the transceiver or an input/output circuit to send and receive a signal, and the memory is configured to store a computer program. The processor is configured to run the computer program in the memory, to enable the apparatus to perform the method completed by the secondary unit in any possible implementation in the second aspect or the fourth aspect.

The communication unit may be a transceiver or a transceiver circuit. Optionally, the transceiver may alternatively be an input/output circuit or an interface.

The apparatus may alternatively be a communication chip. The communication unit may be an input/output circuit or an interface of the communication chip.

In another possible design, the apparatus includes a transceiver, a processor, and a memory. The processor is configured to control the transceiver or an input/output circuit to send and receive a signal, and the memory is configured to store a computer program. The processor is configured to run the computer program in the memory, to enable the apparatus to perform the method completed by the distributed unit according to any one of the second aspect or the possible implementations of the second aspect.

According to a sixth aspect, this application provides a communication system. The system includes the main control unit and the at least one secondary unit.

According to a seventh aspect, a computer-readable storage medium is provided, and is configured to store a computer program. The computer program includes instructions used to perform the method in any possible implementation in the first aspect or the third aspect.

According to an eighth aspect, a computer-readable storage medium is provided, and is configured to store a computer program. The computer program includes instructions used to perform the method in any possible implementation in the second aspect or the fourth aspect.

According to a ninth aspect, a computer program product is provided. The computer program product includes computer program code. When the computer program code is run on a computer, the computer is enabled to perform the method in any possible implementation in the first aspect or the third aspect.

According to a tenth aspect, a computer program product is provided. The computer program product includes computer program code. When the computer program code is run on a computer, the computer is enabled to perform the method according to any one of the second aspect or the possible implementations of the second aspect.

DETAILED DESCRIPTION OF ILLUSTRATIVE EMBODIMENTS

In an LTE (long term evolution) system, a broadcast service is supported through MBMS transmission. An MBMS service is a service oriented to a plurality of terminals. The MBMS usually exists in application scenarios such as a live mobile television broadcast and listening to radio broadcasting by using a mobile phone.

The MBMS is transmitted in an MBSFN (multicast broadcast single frequency network, multicast-broadcast single-frequency network) manner. The MBSFN manner means that a plurality of base stations (or cells in the base stations) in an area send completely same content in subframes that are at the same time. Simply speaking, the plurality of base stations (or the cells in the base stations) perform synchronous transmission of the same content on a same frequency at the same time.

Figure 1:
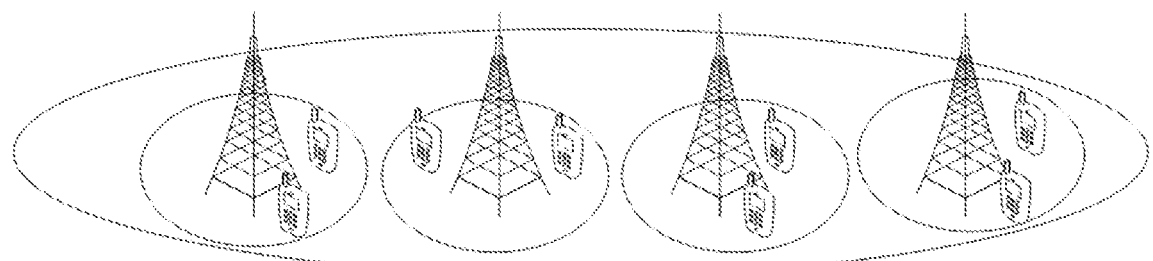
FIG. 1 is a schematic diagram of a synchronous transmission scenario of an MBMS service.

FIG. 1 is a schematic diagram of a scenario in which a plurality of base stations perform synchronous transmission of an MBMS service. Base stations in FIG. 1 work on a same frequency, and send same MBMS data at the same time, to ensure that MBMS data received by terminals in any base station is consistent. Further, for a terminal at a cell edge, because the MBMS data sent by the base stations at the same time is the same, the terminal at the cell edge may superimpose received signals sent by a plurality of base stations, so that the signals received by the terminal are stronger, and a packet loss rate is lower.

Figure 2:
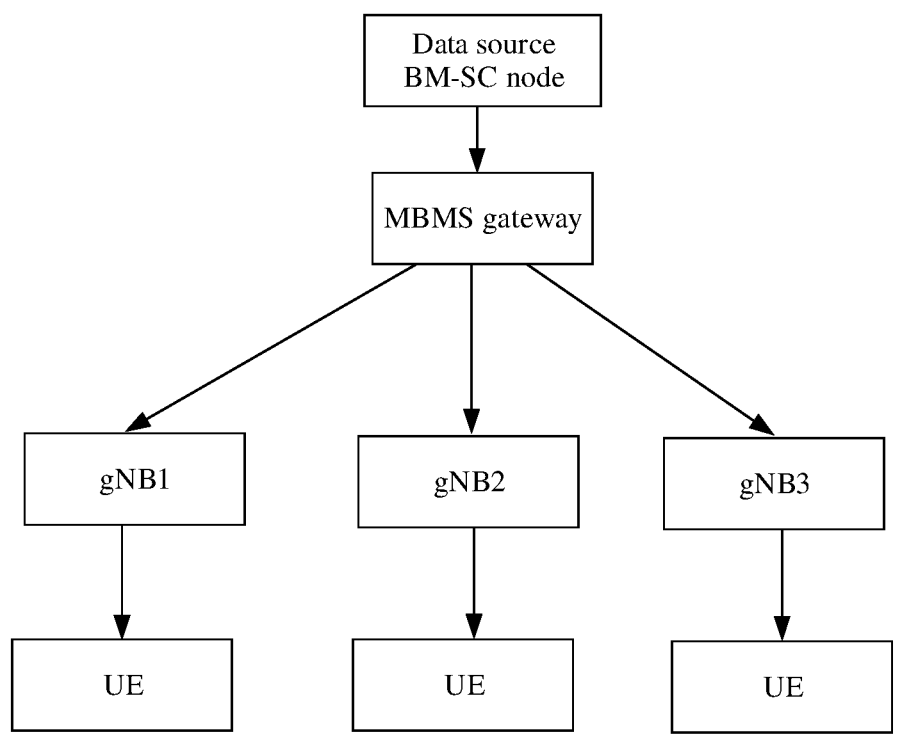
FIG. 2 is a schematic diagram of a network architecture for performing synchronous transmission of an MBMS service.
Figure 3:
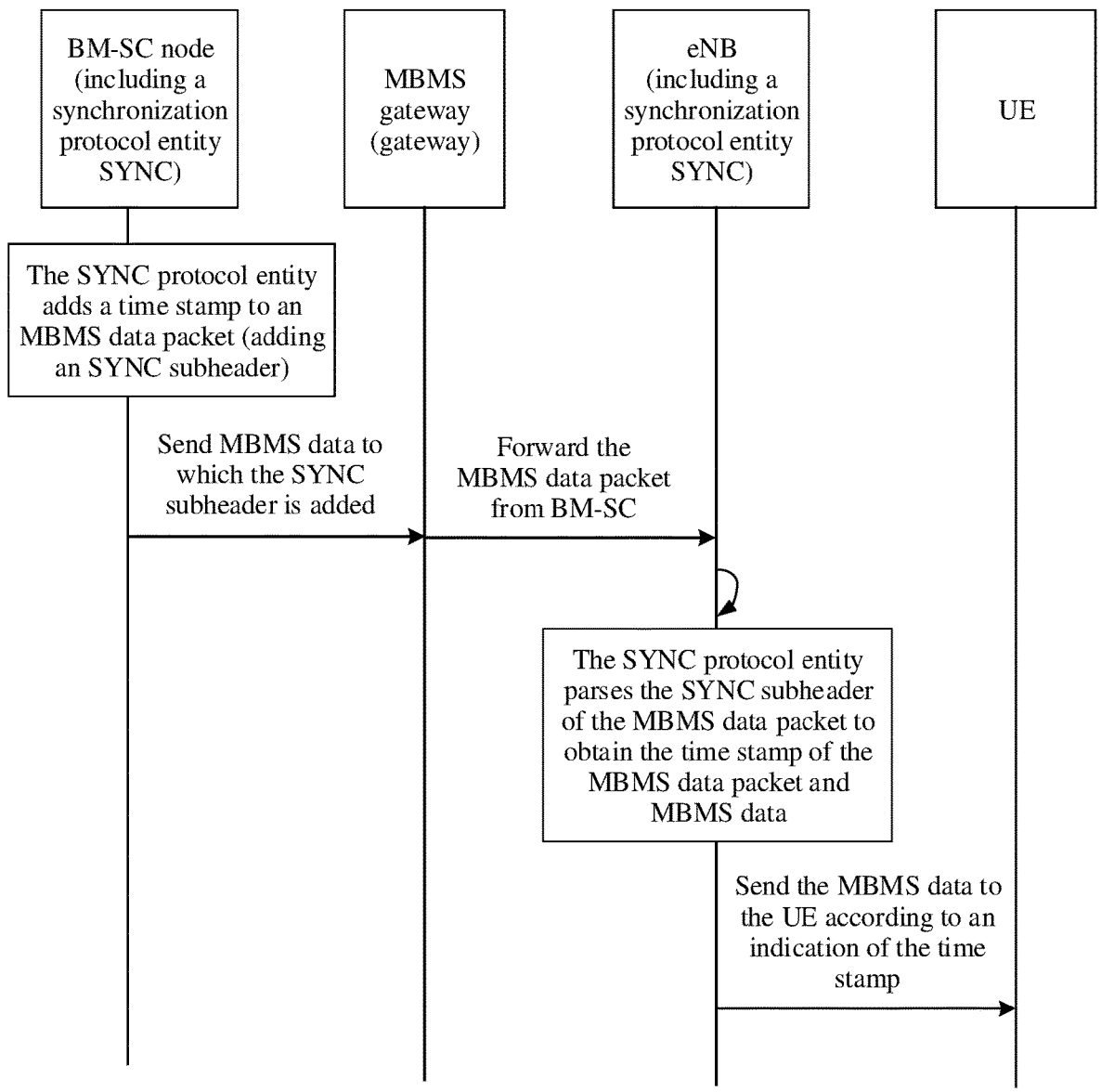
FIG. 3 is a schematic flowchart of performing synchronous transmission of an MBMS service.

FIG. 2 shows a system architecture in a synchronous transmission process of an MBMS service. The system architecture includes a data source (a BM-SC node), a gateway (an MBMS gateway), base stations (eNBs), and terminals (UE). Synchronization protocol entities (SYNCs) are added to the BM-SC node and the eNBs. The SYNC protocol is a protocol for synchronizing data, and is specifically a protocol for synchronizing data used to generate a specific synchronization protocol subheader. FIG. 3 is a schematic flowchart of transmission of an MBMS service based on the network architecture shown in FIG. 2. The procedure includes: In the BM-SC node, the SYNC protocol entity adds a time stamp for each MBMS data packet (referred to as a data packet for short below). A time stamp adding process is that the SYNC protocol entity in the data source BM-SC node adds a synchronization protocol subheader to each data packet. The synchronization protocol subheader includes but is not limited to information such as a time stamp of the data packet. The data packet to which the time stamp is added is sent to the eNB by using the MBMS gateway. After the eNB receives the data packet from the data source BM-SC node, the SYNC protocol entity in the eNB parses the synchronization protocol subheader of the data packet to obtain the information such as the time stamp of the data packet, and determines, based on the time stamp of each data packet, a scheduling periodicity in which each data packet is transmitted. That is, the eNB maps the data packet to the corresponding scheduling periodicity based on a value of the time stamp of the data packet, and sends the data packet to the UE in the corresponding scheduling periodicity.

Figure 4:
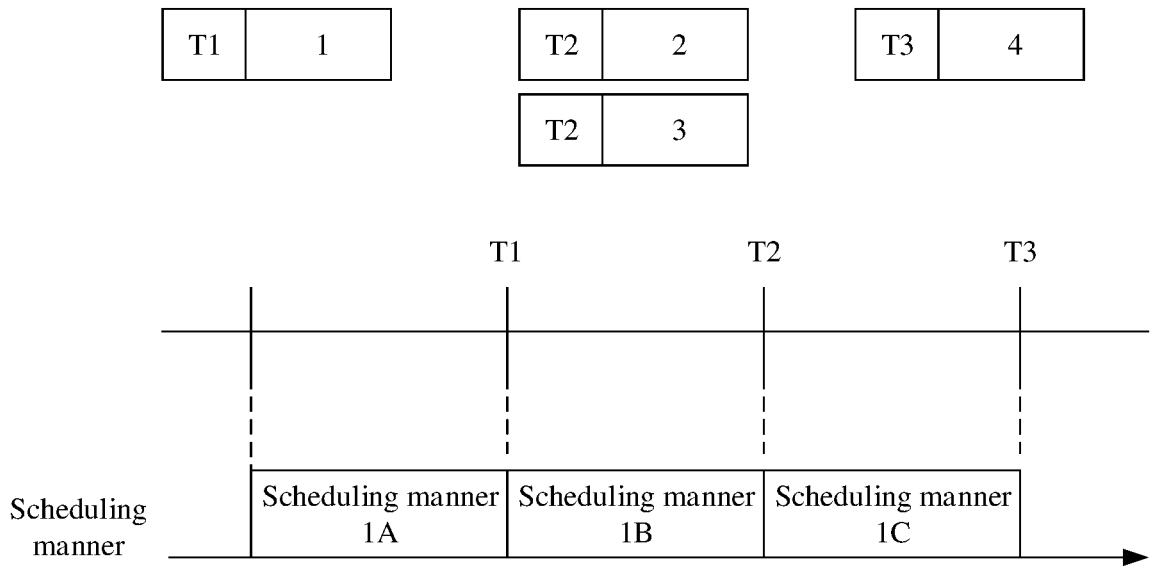
FIG. 4 is a schematic diagram of scheduling MBMS data packets.

The time stamp is a periodic discrete value. The periodicity is referred to as a time sequence. The BM-SC node determines the time stamp of each data packet based on a transmission rate of a broadcast service over an air interface. As shown in FIG. 4, the SYNC protocol entity adds time stamps to a data packet 1 to a data packet 4, and determined time stamps of the data packets include T1, T2, T3, and T4. For example, in FIG. 4, a data amount of the data packet 1, a sum of a data amount of the data packet 2 and a data amount of the data packet 3, and a data amount of the data packet 4 are basically the same. Therefore, as shown in FIG. 4, the SYNC protocol entity may add the time stamp T1 to the data packet 1, add same time stamps T2 to the data packet 2 and the data packet 3, and add the time stamp T3 to the data packet 4.

The SYNC protocol entity in the eNB parses a synchronization protocol subheader of each data packet to obtain time stamps of the data packets, and maps the data packet to corresponding scheduling periodicities based on values of the time stamps. A time length of the scheduling periodicity is an integer multiple of the time sequence. As shown in FIG. 4, for the scheduling manner, the length of the scheduling periodicity is the same as the time sequence. The eNB transmits the data packet whose time stamp is T1 in a scheduling periodicity 1A, transmits the data packets whose time stamps are T2 in a scheduling periodicity 1B, and transmits the data packet whose time stamp is T3 in a scheduling periodicity 1C. In conclusion, the data source BM-SC node adds the time stamp to each data packet so that the base stations synchronously transmit the data packets over the air interface based on the time stamps. Data packets with same time stamps are one synchronization sequence, and the data packets in the synchronization sequence need to be transmitted simultaneously. For example, the data packet 2 and the data packet 3 are one synchronization sequence, and the eNB further needs to determine, based on the synchronization protocol subheaders of the data packets, whether a data packet in the synchronization sequence is lost (where the synchronization protocol subheader includes a total data amount of the data packets in the synchronization sequence), and stops data sending in the scheduling periodicity if it is determined that the data packet is lost, for example, the eNB does not receive the data packet 3. A manner of performing synchronous transmission based on SYNC protocol entities is complex.

In an existing synchronous transmission mechanism, to ensure consistency of transmission content of a plurality of base stations, SYNC protocol entities need to be added to a data source and the base stations. The SYNC protocol entity in the data source adds a time stamp to each data packet, and it is ensured that transmission time deduced by all base stations (or cells) based on the time stamp is the same, so that it is ensured that all the base stations transmit same data at the same transmission time. Therefore, an existing process of implementing synchronous transmission of the MBMS service is complex.

In view of this, to simplify an MBMS synchronization process, this application provides a possible solution. In embodiments of the present invention, no SYNC protocol entity needs to be added to a data source and base stations. That is, no synchronization protocol subheader needs to be added to an MBMS data packet from the data source. Simply speaking, the data source does not need to add a time stamp to the MBMS data packet. A main control unit receives the MBMS data packet from the data source, determines sending time of the MBMS data packet based on a time domain resource of the main control unit and/or a time domain resource of a secondary unit, and sends sending time information (referred to as first time information below) of the data packet to the secondary unit. The secondary unit sends data in the MBMS data packet to UE based on the sending time indicated by the first time information, so that a synchronous transmission process is simplified.

Figure 5:
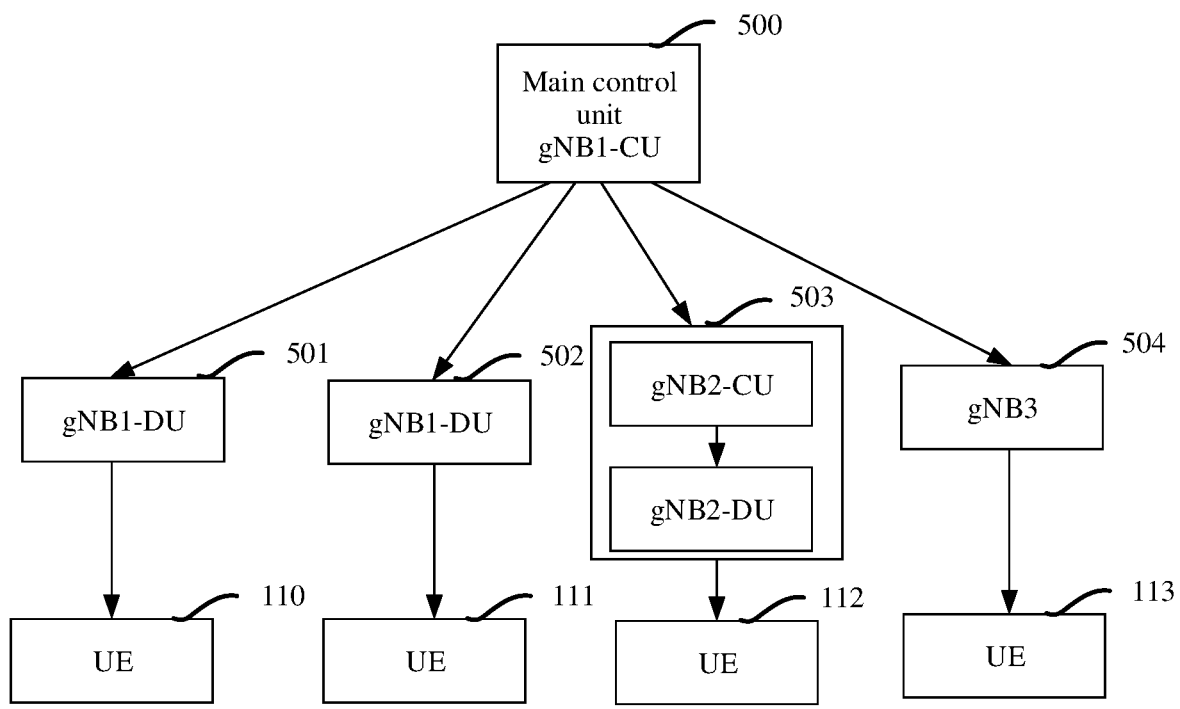
FIG. 5 is a schematic diagram 1 of a network architecture applicable to an embodiment of this application.

FIG. 5 is a schematic diagram of a network architecture applicable to this application. The network architecture includes a network device 50 and at least one terminal device 11. The network device and the terminal device may communicate with each other over a wireless air interface. The network device 50 includes a main control unit 500 and at least one secondary unit. The secondary units 50 include a secondary unit 501 to a secondary unit 505 (including the secondary unit 501, the secondary unit 502, the secondary unit 503, and the secondary unit 504). The terminal devices 11 include a terminal device 110 to a terminal device 113 (including the terminal device 110, the terminal device 111, the terminal device 112, and the terminal device 113).

The terminal device may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet (Pad), a computer having a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in embodiments of this application. A terminal device having a wireless transceiver function and a chip that may be disposed in the terminal device are collectively referred to as a terminal device in this application.

The network device is a device having a wireless transceiver function or a chip that may be disposed in the device. The device includes but is not limited to an evolved NodeB (evolved Node B, eNB), a radio network controller (RNC), a NodeB (Node B, NB), a base station controller (BSC), a base transceiver station (BTS), a home base station (for example, a home evolved NodeB or a home Node B, HNB), a baseband unit (BBU), an access point (AP) in a wireless fidelity (Wi-Fi) system, a wireless relay node, a wireless backhaul node, a transmission point (transmission and reception point, TRP or transmission point, TP), or the like, may be a gNB or a transmission point (a TRP or a TP) in a 5G system such as an NR system or one antenna panel or one group (including a plurality of antenna panels) of antenna panels of a base station in the 5G system, or may be a network node that is included in the gNB or the transmission point, for example, the baseband unit (BBU) or a distributed unit (DU).

Currently, concepts of a centralized unit (CU) and the distributed unit DU (a CU-DU split architecture) are introduced in the 5G NR system. In some deployment, the CU-DU split architecture may be applied to the gNB. That is, the gNB includes the CU and the DU. One base station includes one CU and a plurality of DUs. As shown in FIG. 5, a base station, namely, a gNB1, includes the main control unit 501 (a gNB1-CU), the secondary unit 501 (a gNB1-DU), and the secondary unit 502 (a gNB1-DU).

In the CU-DU split architecture, the gNB may further include a radio unit (RU). The CU implements a part of functions of the gNB, and the DU implements a part of the functions of the gNB. For example, the CU implements functions of a radio resource control (RRC) layer and a packet data convergence protocol (PDCP) layer, and the DU implements functions of a radio link control (RLC) layer, a medium access control (MAC) layer, and a physical (PHY) layer. Information at the RRC layer eventually becomes information at the PHY layer, or is converted from the information at the PHY layer. Therefore, in the architecture, higher layer signaling such as RRC layer signaling or PHCP layer signaling may also be considered as being sent by the DU or sent by the DU and the RU. It may be understood that the network device may be a CU node, a DU node, or a device including the CU node and the DU node. In addition, the CU may be classified as a network device in an access network RAN, or the CU may be classified as a network device in a core network (CN). This is not limited herein. It should be understood that FIG. 5 is merely a simplified schematic diagram used as an example for ease of understanding. The communication system may further include another network device or another terminal device, for example, a core network device, which is not shown in FIG. 5.

The following describes embodiments of this application in detail based on the foregoing network architecture. Before implementation solutions of this application are described, some terms in embodiments of this application are first explained and described, to help a person skilled in the art have a better understanding.

(1) A centralized unit is also referred to as a central unit node or a control functional entity, and mainly refers to an access network centralized control unit. For example, the centralized unit may be a CU (Centralized Unit).

(2) A distributed unit is also referred to as a distributed unit node or a data functional entity, and mainly refers to an access network distributed control unit. For example, the distributed unit may be a DU (Distributed Unit).

(3) A main control unit is a network device having communication and radio frequency functions. The main control unit in embodiments of this application includes but is not limited to: a logical function in a gNB, the centralized unit (for example, a gNB-CU), and the distributed unit (for example, a gNB-CU), or an independent network node such as a multi-cell/multicast coordination entity (MCE).

(4) A secondary unit is a network device having communication and radio frequency functions. The secondary unit in embodiments of this application includes but is not limited to a gNB, the centralized unit (for example, a gNB-CU), the distributed unit (for example, a gNB-CU), or a centralized unit+distributed unit (for example, the gNB-CU+gNB-DU).

(5) A core network device is a device that sends an MBMS data packet to the main control unit and the secondary unit in embodiments of this application. In an existing MBMS service, initial multimedia content is provided by a content provider, a data source BM-SC node adds a time stamp to the multimedia content provided by the content provider, and then sends the multimedia content to a core network, and the core network forwards the multimedia content to an access network (for example, a base station).

(6) Time domain information is used to indicate a time domain resource. The time domain resource includes a slot, a mini-slot, a symbol, a radio frame, a subframe, and the like.
(7) Time-frequency information is used to indicate a frequency domain resource. The frequency domain resource includes a sub-channel, a band, a carrier, a bandwidth part (BWP), a resource block (RB), a resource pool, or the like.
(8) A time-frequency resource includes the time domain resource and/or the frequency domain resource.
(9) In embodiments of this application, information, a signal, a message, or a channel may be interchangeably used sometimes. It should be noted that meanings expressed by the terms are consistent when differences between the terms are not emphasized. "Of", "corresponding, relevant", and "corresponding" may be interchangeably used sometimes. It should be noted that meanings expressed by the terms are consistent when differences between the terms are not emphasized.
(10) "At least one" means one or more, and "a plurality of" means two or more. "And/or" describes an association relationship between associated objects and represents that three relationships may exist. For example, A and/or B may represent the following three cases: Only A exists, both A and B exist, and only B exists. A and B may be in a singular or plural form. The character "/" usually indicates an "or" relationship between the associated objects. "At least one of the following" or a similar expression thereof means any combination of these items, and includes a singular item or any combination of plural items. For example, at least one of a, b, or c may indicate: a, b, c, a and b, a and c, b and c, or a, b, and c, where a, b, and c may be singular or plural.

In addition, unless otherwise stated, ordinal numbers such as "first" and "second" in embodiments of this application are used to distinguish between a plurality of objects, but are not intended to limit an order, a time sequence, priorities, or importance of the plurality of objects. For example, a first data packet and a second data packet are merely used to distinguish between different data packets, but do not indicate a difference in content, priorities, a sending order, importance degrees, or the like of the two data packets.

In addition, the term "for example" in embodiments of this application is used to represent giving an example, an illustration, or a description. Any embodiment or design scheme described as an "example" in this application should not be explained as being more preferred or having more advantages than another embodiment or design scheme. Exactly, the term "example" is used to present a concept in a specific manner.

A network architecture and a service scenario that are described in embodiments of this application are intended to describe the technical solutions in embodiments of this application more clearly, and do not constitute a limitation on the technical solutions provided in embodiments of this application. A person of ordinary skill in the art may know that with evolution of the network architecture and emergence of a new service scenario, the technical solutions provided in embodiments of this application are also applicable to similar technical problems.

Without loss of generality, the following describes embodiments of this application in detail by using an interaction process between a main control unit and a secondary unit and an interaction process between a terminal device and a network device as an example. The terminal device may be a terminal device that is in a wireless communication system and that has a wireless connection relationship with the network device. It may be understood that a data packet may be transmitted, based on same technical solution, between the network device and a plurality of terminal devices that are in the wireless communication system and that have wireless connection relationships with the network device. This is not limited in this application.

The foregoing describes some concepts in embodiments of this application. The following describes technical features in embodiments of this application.

An embodiment of this application provides a communication method. The method may be applied to the application scenario shown in FIG. 5.

Figure 6:
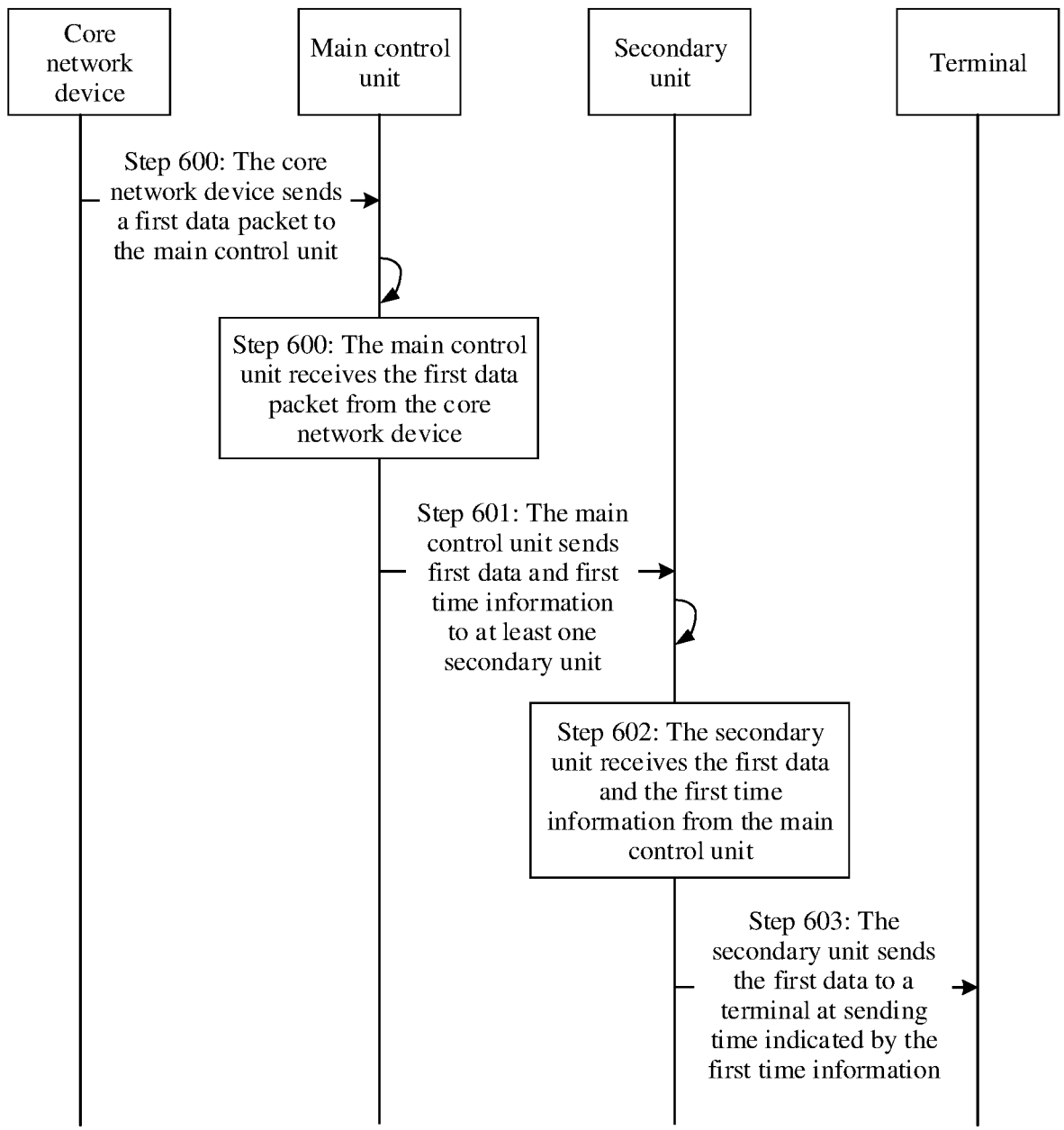
FIG. 6 is a schematic flowchart of a communication method according to an embodiment of this application.

Refer to FIG. 6. The following describes in detail a specific interaction process of the communication method in a first solution. As shown in FIG. 6, the process includes the following steps.

Step 600: A main control unit receives a first data packet sent by a core network device, where the first data packet includes first data.

The core network device sends the first data packet to the main control unit. In this embodiment, the core network device does not need to send the first data packet to a secondary unit for which the main control unit is responsible (or that the main control unit manages), and a time stamp does not need to be added to the first data packet sent by the core network device (where that is, the first data packet does not include a synchronization protocol subheader).

Correspondingly, the main control unit receives the first data packet from the core network device. The first data packet herein may be an MBMS data packet or a data packet of another service.

Step 601: The main control unit sends the first data included in the first data packet and first time information to at least one secondary unit.

The main control unit determines sending time at which the secondary unit sends the first data in the first data packet to a terminal. The main control unit sends the first data and the first time information to the secondary unit. The first time information is used to indicate the sending time of the first data to the secondary unit.

Step 602: The secondary unit receives the first data and the first time information that are sent by the main control unit.

Step 603: The secondary unit sends the first data to the terminal at the sending time indicated by the first time information.

The secondary unit receives the first data and the first time information that are sent by the main control unit, and sends the first data to the terminal by using a time domain resource corresponding to the sending time indicated by the first time information.

For example, the first data sent by the main control unit to the secondary unit may be carried in a second data packet. The secondary unit receives the second data packet sent by the main control unit. Subsequently, the secondary unit sends the first data included in the second data packet to the terminal. The first data sent by the secondary unit to the terminal may be carried in a third data packet. The third data packet is obtained by processing the second data packet, for example, a transport block (the third data packet) obtained through encapsulation at a physical layer after the secondary unit transfers the second data packet to the physical layer.

For ease of understanding and distinguishing, a plurality of data packets in this specification are first described in detail. The plurality of data packets in this specification include the first data packet, the second data packet, the third data packet, and fourth data. Descriptions are as follows.

(1) The first data packet is a data packet from the core network device (or a data packet that is from a data source and that is forwarded by using another network device or a node), for example, the MBMS data packet or the data packet of the service other than an MBMS.

The first data packet includes the first data. The first data may be a part or all of data in the first data packet. Optionally, if the main control unit can determine, when determining the first time information of the first data, that the secondary unit can completely send all the data in the first data packet at the sending time indicated by the first time information, the first data is all the data in the first data packet. Alternatively, if the main control unit determines that the secondary unit cannot completely send all the data in the first data packet once at the sending time indicated by the first time information, the first data is the part of the data in the first data packet.

(2) The second data packet is a data packet sent by the main control unit to the secondary unit after the main control unit processes the first data packet from the core network device. When the main control unit sends the processed data packet to the secondary unit, the processed data packet is encapsulated in an interface protocol among network nodes, and is transmitted as a load part. For example, when a GTP-U protocol is the interface protocol among network nodes, the main control unit transmits processed data in the first data packet, for example, a MAC PDU or a PDCP PDU, as a load part of a PDU of a GTP-U. The second data packet in this embodiment of this application may include the first data in the first data packet, and may further include some other information (for example, the first time information or grant information (grant) described below) that may be carried in a packet header part (for example, a packet header part of the GTP-U or a packet header that is of a PDU at any protocol layer and that a network device has) of a PDU of the interface protocol among network nodes. For example, assuming that the main control unit has a PDCP layer, and the secondary unit has an RLC layer and a MAC layer, the second data packet sent by the main control unit to the secondary unit is the PDCP PDU generated by processing the first data packet at the PDCP layer. For another example, assuming that the main control unit has a PDCP layer, an RLC layer, and a MAC layer, and the secondary unit has a physical layer, the second data packet sent by the main control unit to the secondary unit is the MAC PDU generated by processing the first data packet at the PDCP layer, the RLC layer, and the MAC layer.

It should be noted that currently, the RLC protocol layer and the MAC protocol layer exist in a same entity. Therefore, in this embodiment of this application, the second data packet transmitted by the main control unit to the secondary unit is the PDCP PDU or the MAC PDU. If the RLC protocol layer and the MAC protocol layer may not coexist in one entity in the future, the second data packet in this embodiment of this application may alternatively be an RLC PDU. For a procedure of processing the RLC PDU by the main control unit and the secondary unit, refer to the procedure of processing the PDCP PDU or the MAC PDU in this embodiment of this application. Details are not described herein again.

(3) The third data packet is a data packet sent by the secondary unit to the terminal after the secondary unit processes the second data packet. For example, if the second data packet is the PDCP PDU, the third data packet sent by the secondary unit to the terminal is a MAC PDU generated by processing the PDCP PDU, or the third data packet is the physical layer transport block generated by sending the MAC PDU to the physical layer for processing.

(4) The fourth data packet is another second data packet or a data packet of another service received by a distributed unit from the main control unit, and the fourth data packet is replaced with the another second data packet below.

The following describes the implementation method shown in FIG. 6 in detail with reference to the accompanying drawing.

In the foregoing embodiment, according to step 600 to step 603, it can be learned that a data packet transmission procedure may be summarized as follows: The core network device sends the first data packet to the main control unit, the main control unit sends the second data packet to the secondary unit, and the secondary unit sends the third data packet to the terminal. In this embodiment, the second data packet has a plurality of forms, for example, data units corresponding to different protocol layers of the main control unit. For ease of understanding and distinguishing, the following uses the MBMS data packet as an example to replace the first data packet, and generating second data packets in different forms by processing the first data packet by the main control unit is used as an example for description below.

Figure 7:
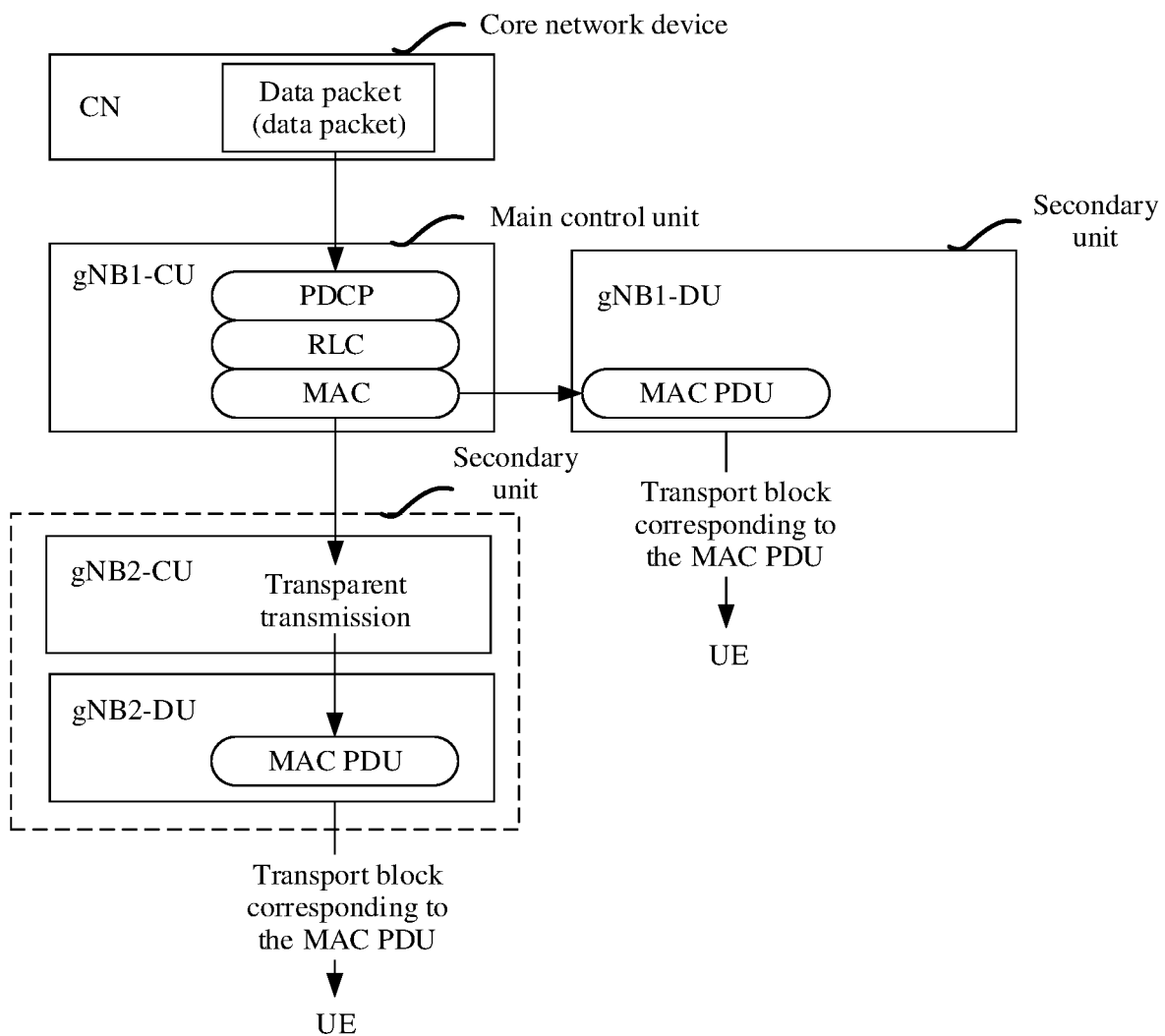
FIG. 7 is a schematic block diagram 1 of data transmission of a network architecture according to an embodiment of this application.

In an implementable example, as shown in FIG. 7, the main control unit is a CU (a gNB1-CU), and the CU includes but is not limited to a PDCP protocol layer, an RLC protocol layer, and a MAC protocol layer. Distributed units include a gNB1-DU and a gNB2-CU+gNB2-DU, and the distributed unit includes but is not limited to a MAC layer. The core network device (CN) sends the MBMS data packet (for example, a data packet shown in FIG. 7) to the main control unit, and the main control unit receives the MBMS data packet from the core network device. A person skilled in the art may know that the MBMS data packet received by the main control unit from the core network device belongs to an IP packet (a high layer data packet). Before sending the MBMS data packet to the secondary unit, the main control unit needs to process the MBMS data packet to generate a data packet, namely, the second data packet, in a data format applicable to transmission between the main control unit and the secondary unit. As shown in FIG. 7, the main control unit has the PDCP protocol layer, the RLC protocol layer, and MAC protocol layer, and the secondary unit has a physical layer. In this case, the second data packet sent by the main control unit to the secondary unit is a MAC PDU corresponding to the MBMS data packet. A procedure in which the main control unit generates the MAC PDU corresponding to the first data packet is as follows: The main control unit processes the MBMS data packet at the PDCP protocol layer, the RLC protocol layer, and MAC protocol layer in sequence to generate the MAC PDU corresponding to the MBMS data packet, and adds first time information to the MAC PDU. It should be noted that the MAC PDU sent by the main control unit includes first data in the MBMS data packet. The first time information may be carried in one separate MAC PDU and sent together with the MAC PDU including the first data, or may be carried in one MAC PDU obtained by concatenating two MAC PDUs.

That the main control unit sends the generated MAC PDU and the first time information to the secondary unit, namely, the gNB1-DU, may alternatively be understood as that the MAC layer of the main control unit sends the MAC PDU to the gNB1-DU. The gNB1-DU sends the MAC PDU to a physical layer of the gNB1-DU. The physical layer forms a transport block (the third data packet) corresponding to the MAC PDU. The secondary unit sends the transport block to the terminal by using a time domain resource corresponding to sending time indicated by the first time information.

For the other secondary unit, namely, the gNB2-CU+ gNB2-DU, the main control unit may alternatively send the generated MAC PDU and the first time information to the secondary unit, namely, the gNB2-CU+gNB2-DU. After receiving the MAC PDU sent by the main control unit, the gNB2-CU transparently transmits the MAC PDU to the gNB2-DU. The gNB2-DU sends the MAC PDU to a physical layer of the gNB2-DU. The physical layer forms a transport block (the third data packet) corresponding to the MAC PDU. The secondary unit sends the transport block to the terminal by using the time domain resource corresponding to the sending time indicated by the first time information.

The following describes in detail a procedure of processing the MBMS data packet at each protocol layer.

Figure 8:
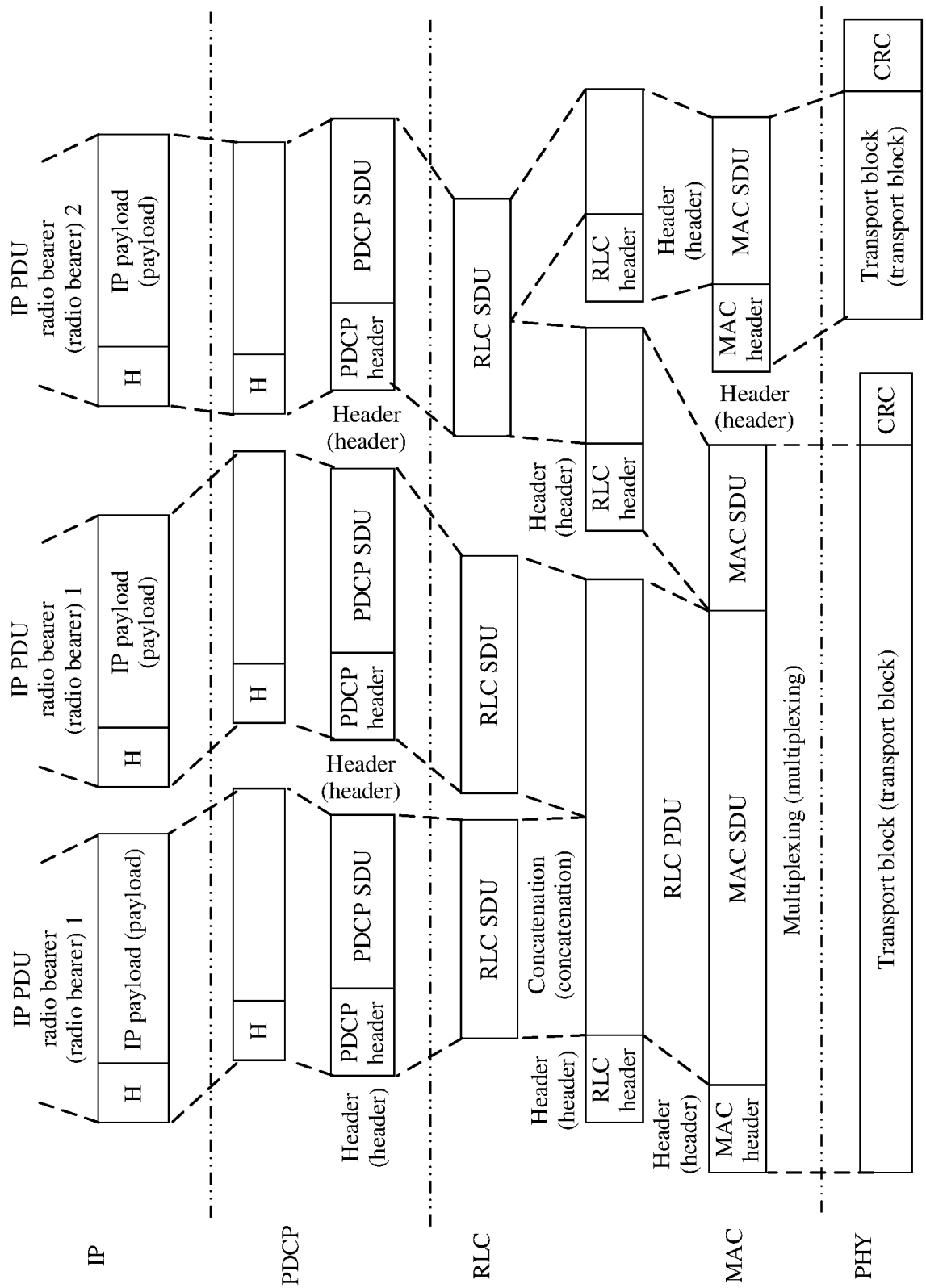
FIG. 8 is a schematic flowchart of data processing at each protocol layer.

An LTE (long term evolution) system is used as an example. FIG. 8 is a schematic flowchart of user plane data processing. An air interface user plane layer 2 includes a PDCP (packet data convergence protocol) layer, an RLC (radio link control) layer, and a MAC (medium access control) layer. A data packet processed at the layer 2 arrives at a physical layer, and becomes, through processing such as coding and modulation at the physical layer (a layer 1), a bit stream sent over an air interface. A specific step procedure may include the following steps.

Step 1. Processing at the PDCP layer: The PDCP layer has header compression, sorting, and encryption functions, performs header compression, sequence number adding, and encryption on the IP data packet, then uses the IP data packet as a PDCP SDU (service data unit), adds a PDCP header to form a PDCP PDU, and sends the PDCP PDU to the RLC layer. The three functions are all optional, and all the three functions or some of the functions may be performed optionally.

Step 2. Processing at the RLC layer: The RLC layer has segmentation and concatenation functions. The PDCP PDU (Packet Data Unit, protocol data unit) becomes an RLC SDU at the RLC layer. The RLC layer may organize a plurality of RLC SDUs into one RLC PDU, or may segment one RLC SDU into a plurality of RLC PDUs. The concatenation function is optional, or concatenation processing may be performed at the MAC layer.

Step 3. Processing at the MAC layer: The MAC layer has a multiplexing function, and may concatenate the plurality of RLC PDUs (which are referred to as MAC SDUs at the MAC layer) to form one MAC PDU. The plurality of RLC PDUs may be from one bearer or may be from a plurality of bearers.

Step 4. Processing at the physical layer: The MAC PDU is sent to the physical layer. The physical layer performs CRC (cyclic redundancy check) addition and other physical layer modulation and coding processing on the MAC PDU, to form a transport block and send the transport block over the air interface.

It should be noted that, in this embodiment of this application, a first frequency resource configured based on first configuration information is a resource used to carry data, and an amount of data that can be carried on the first frequency resource may be understood as a size (excluding physical layer overheads) of the MAC PDU corresponding to the first data.

After receiving the physical layer bit stream, the terminal obtains the IP (internet protocol) data packet through parsing based on a reverse process.

The schematic flowchart of generating the second data packet (the PDCP PDU or the MAC PDU) by the main control unit is shown above. The following describes in detail a procedure of a method for adding the first time information to the generated second data packet by the main control unit.

First, the first time information is described. A function of the first time information is to indicate, to the secondary unit, the sending time that is of the first data and that may also be understood as the sending time that is determined by the main control unit for the secondary unit and at which the secondary unit sends the first data to the terminal.

For further optimization, to ensure that a plurality of secondary units can perform synchronous transmission, each secondary unit should have an idle time domain resource at the sending time indicated by the first time information. In other words, when adding the first time information to the MAC PDU, the main control unit should be capable of determining information about a time domain resource of each secondary unit. In a feasible manner, a same time domain resource is configured for the main control unit and the secondary units. The time domain resource may be configured by the main control unit or another network node (for example, a multi-cell/multicast coordination entity other than the main control unit). For example, the main control unit determines the first configuration information, where the first configuration information includes information about a first time domain resource. The main control unit sends the first configuration information to the secondary unit, and the secondary unit configures, based on the first configuration information, the first time domain resource used to transmit MBMS service data. This may be understood as that the secondary unit reserves, according to an indication of the main control unit, each time-frequency resource included in the first configuration information. The reserved time domain resource cannot be used to transmit data of the another service, to ensure that the secondary unit has, at the sending time indicated by the first time information delivered by the main control unit, a time domain resource for transmitting an MBMS service, so that it is ensured that the secondary units can perform synchronous transmission. In another feasible manner, the main control unit obtains information about time domain resources of the secondary units, and determines that the sending time of the first data is included in time domain resources that have an intersection and that are in the time domain resources of the secondary units. In a third feasible manner, the secondary units negotiate a common time domain resource, where the time domain resource may be a time domain resource in an intersection of idle time domain resources of the secondary units. Alternatively, the secondary units negotiate a forcibly reserved time domain resource, and one or more of the secondary units report information about the time domain resource to the main control unit.

The following describes in detail a manner of configuring the first time domain resource by using the first configuration information.

Before sending the first data and the first time information to the secondary unit, the main control unit sends the first configuration information to the secondary unit. The secondary unit reserves a corresponding time domain resource (the first time domain resource) based on the first configuration information.

Figure 9A:
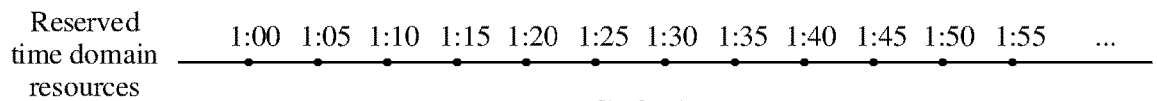
FIG. 9($a$) and FIG. 9($b$) each are a schematic diagram of reserved first time domain resources according to an embodiment of this application.
Figure 9B:
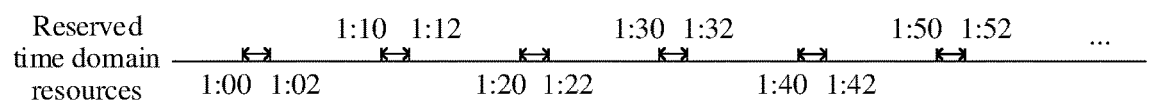

First time domain resources may be periodic or aperiodic discrete values or consecutive values. The periodic discrete values may be understood as a plurality of moments at an equal interval, and the periodic consecutive values may be understood as a plurality of time periods at an equal interval. For example, the periodic discrete values are 1:00, 1:05, 1:10, . . . , as shown in FIG. 9(a); periodic consecutive values are 1:00-1:02, 1:10-1:12, 1:20-1:22, . . . , as shown in FIG. 9(b). It should be noted that the interval may alternatively be 0.

The following uses the first time domain resources shown in FIG. 9(a) as an example to describe a procedure of a method for selecting, by the main control unit from the first time domain resources, a time domain resource on which the secondary unit sends the first data to the terminal.

For example, if the main control unit receives, at a moment 1:01, the MBMS data packet sent by the core network device, the time domain resource on which the secondary unit sends the first data to the terminal may be a time domain resource that is not occupied by another MBMS data packet and that is after 1:01, for example, a time domain resource at 1:05 or 1:10. Assuming that the time domain resource at 1:05 is not occupied by other MBMS service data, the main control unit determines that the first time information may indicate the secondary unit to send the first data at 1:05. The sending time indicated by the first time information may also be referred to as a first time domain resource corresponding to the first data. The sending time may be a start moment of the first time domain resource, or may be information about a period of time representing the start moment and a stop moment of the first time domain resource. The first time domain resource (1:20-1:22) shown in FIG. 9(b) is used as an example. The first time information may be a start moment (1:20) of the first time domain resource, a moment (1:21) included in the first time domain resource, or a start-stop time period (1:20-1:22) of the first time domain resource.

It should be understood that there may be a plurality of conditions for determining the first time information by the main control unit. For example, it should be ensured that time at which the secondary unit receives the first time information is earlier than the sending time indicated by the first time information. When an SYNC protocol entity in an existing data source BM-SC node adds time stamps to data packets, to ensure that all base stations can receive the data packets before sending time indicated by the time stamps, the data source BM-SC node needs to be indulgent to a base station that costs longest transmission duration, to add the time stamps to all the data packets. For a base station that costs shorter transmission duration, a data packet received earlier may need to wait for a long time before sending data in the data packet. Therefore, a transmission latency is increased. Based on the manner in this application, the main control unit and the secondary unit may be considered as base stations in an existing same MBSFN area. Therefore, duration of data transmission between the base stations is less than duration of data transmission between the core network device and the base stations, so that the transmission latency is reduced.

It should be noted that the values of the first time domain resources are merely examples. A value and accuracy of the first time domain resource are not limited in this embodiment of this application. For example, the first time domain resource may be accurate to a second, a millisecond, or a microsecond. In this embodiment of this application, the first time information is identified in a plurality of manners. For example, the first time information may include but is not limited to a part or all of a frame number of a radio frame, a slot number, and a symbol quantity, or the first time information includes but is not limited to a number of the first time domain resource. Any manner that can be used to identify a time domain resource is applicable to this embodiment of this application.

Numbers of first time domain resources are identifiers that are of the first time domain resources and that are configured based on the first configuration information. The identifier may include one or more of a digit, a letter, or a symbol. The identifiers of the first time domain resources may be values that have a regular sequence, and are used to indicate a time sequence of the first time domain resources. Alternatively, the identifiers of the first time domain resources are identifiers that do not have regularity, and the identifier corresponds to one first time domain resource. For example, 10 first time domain resources are configured based on the first configuration information, identifiers of the first time domain resources are digits, and the identifiers may be values that have a regular sequence. For example, numbers of all the first time domain resources may be digits in descending order or in ascending order, for example, 1 to 10, 2 to 11, or 20 to 10. For another example, numbers of the first time domain resource are values that do not have regularity, and the identifier corresponds to one first time domain resource. For example, numbers of all the first time domain resources arranged in a time sequence are 4, 5, a, f, 7, 8, t, y, 0, and 6. Correspondingly, the first time information may be at least one of the foregoing numbers.

In another example, the first configuration information may further include information about first frequency domain resources, to indicate sizes of the first frequency domain resources reserved by the secondary unit at the first time domain resources indicated by the first configuration information. In this way, the main control unit may further determine the first time information based on amounts of data that can be carried by the reserved first frequency domain resources corresponding to first time domain resources, and determine, based on sizes of PDCP PDUs corresponding to the MBMS data packet and a size of a first frequency domain resource corresponding to the sending time indicated by the first time information, whether to segment or concatenate the PDCP PDUs.

A case in which one PDCP PDU is segmented is described below by using an example.

Figure 10:
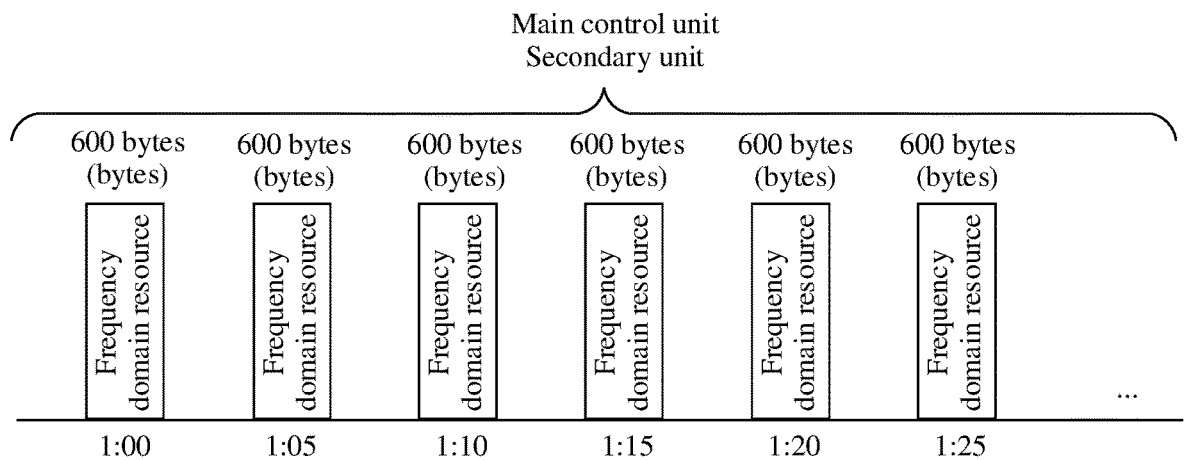
FIG. 10 is a schematic diagram of reserved first time domain resources according to an embodiment of this application.

For example, FIG. 10 is a schematic diagram of time-frequency resources reserved by the main control unit and the secondary unit based on the first configuration information. It is assumed that the first frequency domain resources corresponding to the first time domain resources are the same, and the amounts of data that can be carried by the first frequency domain resources are all 600 bytes, that is, amounts of data that can be carried by all reserved time-frequency resources are the same.

It is assumed that the second data packet sent by the main control unit to the secondary unit is the MAC PDU. After receiving the MBMS data packet from the core network device, the main control unit first processes the MBMS data packet at the PDCP layer to generate the PDCP PDU. If a size of the PDCP PDU is 1000 bytes, in other words, data in the PDCP PDU cannot be completely transmitted by using one reserved time-frequency resource (600 bytes), the secondary unit determines to divide the PDCP PDU into at least two segments, that is, the PDCP PDU is divided into at least two MAC PDUs, where a size of each MAC PDU should be less than or equal to 600 bytes. For example, with reference to the procedure of segmenting the PDCP PDU in FIG. 8, the PDCP PDU is sent to the RLC layer, and the PDCP PDU is divided into two segments at the RLC layer. The first segment of the PDCP PDU is encapsulated into an RLC PDU 1, and the RCL PDU 1 is sent to the MAC layer to generate a MAC PDU 1; the second segment of the PDCP PDU is encapsulated into an RLC PDU 2, and the RCL PDU 1 is sent to the MAC layer to generate a MAC PDU 2. Assuming that a size of the MAC PDU 1 is 600 bytes and a size of the MAC PDU 2 is 400 bytes, the main control unit adds corresponding first time information to the MAC PDU 1 and the MAC PDU 2 respectively. For example, with reference to the schematic diagram of the time-frequency resources shown in FIG. 10, assuming that the main control unit determines that sending time indicated by the first time information of the MAC PDU 1 is 1:05, the main control unit determines that a time domain resource indicated by the first time information of the MAC PDU 2 is a time domain resource after a moment A, for example, a time domain resource corresponding to 1:10.

It should be understood that, if an amount of data in the PDCP PDU is less than the amount of the data that can be carried by the first frequency domain resource, that is, the secondary unit can completely send the data included in the PDCP PDU to the terminal once by using the first time domain resource, the main control unit does not need to segment the PDCP PDU when a MAC PDU is to be generated based on the PDCP PDU. In other words, in this case, the PDCP PDU corresponds to one MAC PDU. Therefore, it is associated with another possible case in which sizes of a plurality of PDCP PDUs are all less than the size of the first frequency domain resource. The main control unit may alternatively concatenate the plurality of PDCP PDUs to generate one MAC PDU (refer to the concatenation procedure shown in FIG. 8).

A case in which the plurality of PDCP PDUs are concatenated is described below by using an example.

Same as above. It is assumed that the first frequency domain resources corresponding to the first time domain resources are the same, and are all of 600 bytes, and the second data packet sent by the main control unit to the secondary unit is the MAC PDU. The main control unit receives a plurality of MBMS data packets including a data packet 6 and a data packet 7 from the core network device this time. The main control unit separately performs layer processing on the plurality of MBMS data packets to generate PDCP PDUs corresponding to the MBMS data packets. The data packet 6 corresponds to the PDCP PDU 1, and the data packet 7 corresponds to the PDCP PDU 2. It is assumed that an amount of data in the PDCP PDU 1 is 200 bytes, and an amount of data in the PDCP PDU 2 is 150 bytes. PDCP PDU 1+PDCP PDU 2<600 bytes. In other words, the data in the PDCP PDU 1 and the data in the PDCP PDU 2 can be completely transmitted by using one reserved time-frequency resource (where it is assumed that information added at each protocol layer does not exceed 600 bytes-200 bytes-150 bytes, namely, 250 bytes). Therefore, the main control unit may concatenate the PDCP PDU 1 and the PDCP PDU 2 to generate one MAC PDU (where the MAC PDU includes the data in the PDCP PDU 1 and the data in the PDCP PDU 2), and send the MAC PDU and determined first time information to the secondary unit.

The main control unit executes the foregoing method procedure for any MBMS data packet from the core network device, to generate a MAC PDU corresponding to the MBMS data packet, and sends each MAC PDU and first time information to the secondary unit after adding the first time information to the MAC PDU. The secondary unit sends data in the MAC PDU to the terminal based on sending time indicated by the first time information of each MAC PDU.

Based on the foregoing method, the main control unit processes the MBMS data packets at the MAC layer, and specifies the first time information for each MAC PDU. In this way, the sending time of each MAC PDU is independent, and is not affected by loss of a data packet. In addition, no SYNC protocol entity needs to be added to the main control unit, the secondary unit, and the core network device, so that a synchronous transmission process is simplified.

Figure 11:
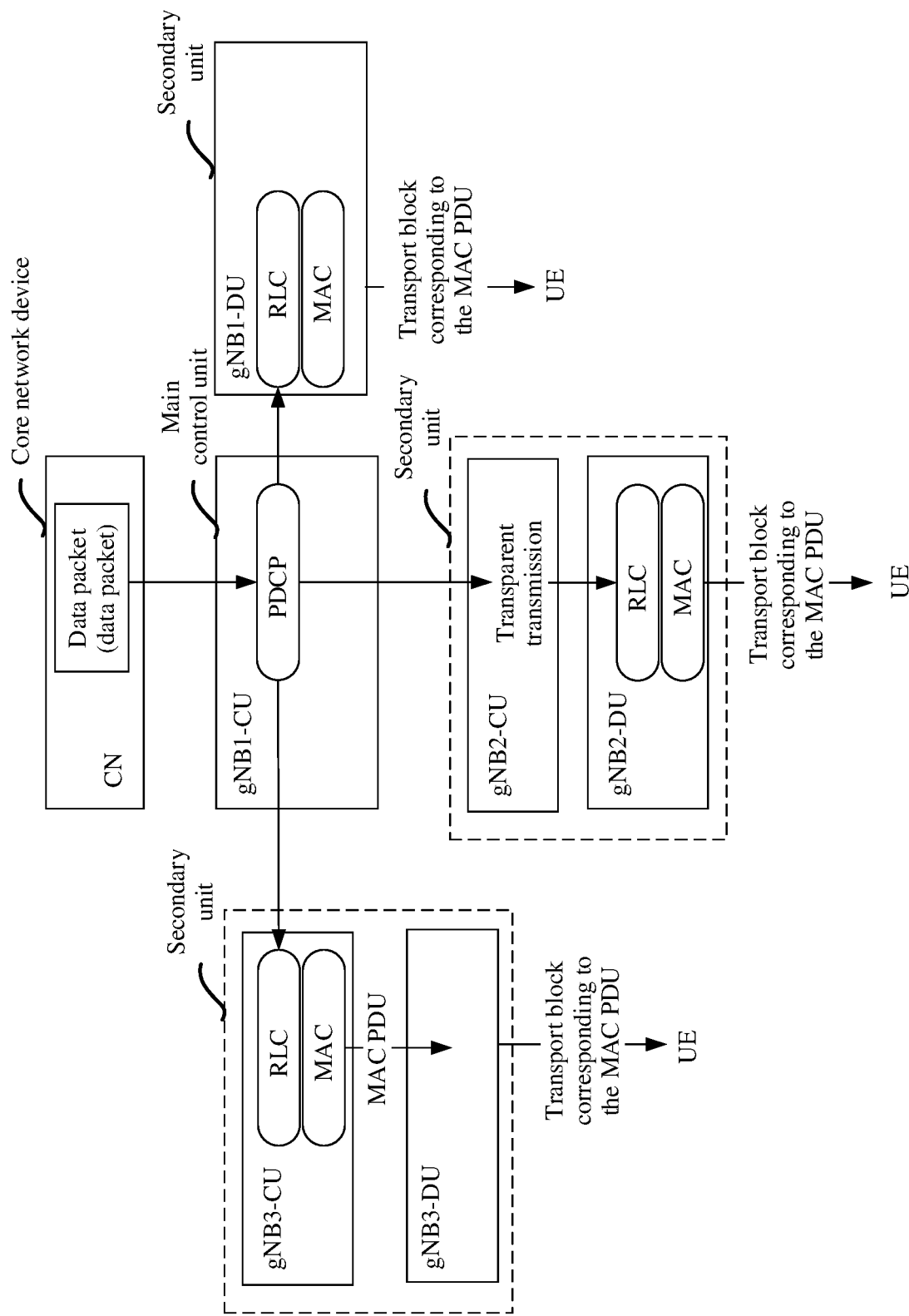
FIG. 11 is a schematic block diagram 2 of data transmission of a network architecture according to an embodiment of this application.

In another implementable example, as shown in FIG. 11, the main control unit is a CU (a gNB1-CU), and the CU includes but is not limited to a PDCP protocol layer. Distributed units include a gNB1-DU and a gNB2-CU+gNB2-DU, and the distributed unit includes but is not limited to an RLC layer and a MAC layer. The core network device CN sends the MBMS data packet (for example, a data packet in FIG. 11) to the main control unit. After receiving the MBMS data packet from the core network device, the main control unit processes the MBMS data packet at the PDCP layer to generate a PDCP PDU (the second data packet) corresponding to the MBMS data packet, and adds first time information to the PDCP PDU.

That the main control unit sends the generated PDCP PDU and the first time information to the secondary unit, namely, the gNB1-DU, may also be understood as that the PDCP layer of the main control unit sends the PDCP PDU to the RLC layer of the gNB1-DU. The gNB1-DU processes the received PDCP PDU at the RLC protocol layer and MAC protocol layer sequentially, to generate a MAC PDU corresponding to the PDCP PDU. The gNB1-DU sends the MAC PDU to a physical layer. The physical layer forms a transport block (the third data packet) corresponding to the MAC PDU, and the transport block is sent to the terminal by using a time domain resource corresponding to sending time indicated by the first time information.

For the other secondary unit, namely, the gNB2-CU+gNB2-DU, when the main control unit sends the generated PDCP PDU and the first time information to the secondary unit, namely, the gNB1-DU, the main control unit may alternatively send a same PDCP PDU and same first time information to the secondary unit, namely, the gNB2-CU+gNB2-DU. The gNB2-CU transparently transmits the PDCP PDU to the gNB2-DU. The gNB2-DU performs a same operation as that performed by the secondary unit, namely, the gNB1-DU. The gNB2-DU sends, to the terminal by using the time domain resource corresponding to the sending time indicated by the first time information, the transport block corresponding to the MAC PDU.

Likewise, for a secondary unit, namely, a gNB3-CU+gNB3-DU, the main control unit sends the same PDCP PDU and the same first time information to the secondary unit, namely, the gNB3-CU+gNB3-DU. Optionally, a centralized unit, namely, a gNB3-CU, may further process the received PDCP PDU at each protocol layer, to generate the MAC PDU corresponding to the PDCP PDU. The centralized unit, namely, the gNB3-CU, sends the generated MAC PDU to the distributed unit, namely, the gNB3-DU. The distributed unit, namely, the gNB3-DU, sends, to the terminal by using the time domain resource corresponding to the sending time indicated by the first time information, the transport block corresponding to the MAC PDU.

What is different from the manner shown in FIG. 7 is that the main control unit only processes the MBMS data packet to the PDCP layer, that is, the second data packet sent to the secondary unit is the PDCP PDU. If PDCP PDUs need to be concatenated and segmented, the secondary unit performs a segmentation or concatenation operation on the PDCP PDUs.

The following describes, by using an example, a processing procedure in which the secondary unit segments the received PDCP PDU.

For example, it is assumed that first frequency domain resources corresponding to first time domain resources are the same, amounts of data that can be carried are all 600 bytes, and the second data packet sent by the main control unit to the secondary unit is the PDCP PDU. It is assumed that a size of the PDCP PDU generated by the main control unit based on the MBMS data packet from the core network device is 900 bytes. In other words, when the PDCP PDU is sent to the terminal, data included in the PDCP PDU cannot be completely sent by using one first time domain resource. That is, the PDCP PDU needs to be segmented. The first time information that is of the PDCP PDU and that is determined by the main control unit is used to indicate sending time of the first MAC PDU corresponding to the PDCP PDU.

The main control unit sends the PDCP PDU (900 bytes) and the first time information to the secondary unit. After receiving the PDCP PDU, the secondary unit segments the PDCP PDU based on the amount of the data in the PDCP PDU and a size of a first frequency domain resource corresponding to the sending time indicated by the first time information. In this example, the secondary unit may divide the PDCP PDU into at least two segments, that is, generate at least two MAC PDUs corresponding to the PDCP PDU. The secondary unit sends, to the terminal by using a time-frequency resource corresponding to the sending time indicated by the first time information, data in the first MAC PDU corresponding to the PDCP PDU, and sends data in the second MAC PDU by using a neighboring reserved time domain resource after the sending time.

It should be understood that if the PDCP PDU does not need to be segmented, the first time information is used to indicate sending time of a unique MAC PDU corresponding to the PDCP PDU.

The following describes, by using an example, a procedure in which the secondary unit concatenates received PDCP PDUs.

The condition in the foregoing example is referenced. To be specific, the first frequency domain resources corresponding to the first time domain resources are the same, the amounts of the data that can be carried are all 600 bytes, and the second data packet sent by the main control unit to the secondary unit is the PDCP PDU. The main control unit receives a plurality of pieces of MBMS data including a data packet 1 and a data packet 2 from the core network device. The main control unit performs layer processing on the plurality of MBMS data packets to generate PDCP PDUs corresponding to the data packets. The data packet 1 corresponds to a PDCP PDU 1, and the data packet 2 corresponds to a PDCP PDU 2. The main control unit sends the PDCP PDU 1 and first time information corresponding to the PDCP PDU 1 to the secondary unit, and meanwhile or then, the main control unit sends the PDCP PDU 2 and first time information corresponding to the PDCP PDU 2 to the secondary unit.

It is assumed that an amount of data in the PDCP PDU 1 is 200 bytes, and an amount of data in the PDCP PDU 2 is 150 bytes. PDCP PDU 1+PDCP PDU 2<600 bytes. In other words, the data in the PDCP PDU 1 and the data in the PDCP PDU 2 can be completely transmitted by using one reserved time-frequency resource. Therefore, the first time information corresponding to the PDCP PDU 1 and the first time information corresponding to the PDCP PDU 2 may indicate same sending time. In addition, to reduce an operation of generating a plurality of MAC PDUs by the secondary unit, the PDCP PDUs having the same sending time may be concatenated, to generate one MAC PDU corresponding to the plurality of PDCP PDUs. For example, the sending time indicated by the first time information corresponding to the PDCP PDU 1 is 1:10, and the sending time indicated by the first time information corresponding to the PDCP PDU 2 is also 1:10. To prevent the secondary unit from directly encapsulating the PDCP PDU 1 into a MAC PDU when receiving the PDCP PDU 1, the main control unit may further send a concatenation indication to the secondary unit, to indicate the secondary unit to concatenate the data packets (the PDCP PDU 1 and the PDCP PDU 2) having the same sending time into one MAC PDU, and then send a transport block corresponding to the MAC PDU to the terminal. The main control unit determines the concatenation indication based on a quantity of MAC PDUs having same sending time, and sends the concatenation indication to the secondary unit. Assuming that the secondary unit determines, according to the concatenation indication, that there are two PDCP PDUs (namely, the PDCP PDU 1 and the PDCP PDU 2) having the same sending time, the secondary unit concatenates the PDCP PDU 1 and the PDCP PDU 2 after receiving the PDCP PDU 2 whose sending time is the same as the sending time indicated by the first time information of the PDCP PDU 1, to generate one MAC PDU. Then, data in the concatenated MAC PDU is sent to the terminal by using a time domain resource corresponding to the sending time indicated by the first time information.

There are a plurality of indication manners of a concatenation indication. For example, the concatenation indication includes quantity information of PDCP PDUs having same sending time, for example, N PDCP PDUs that need to be concatenated (referred to as "to be concatenated" below) or a total data amount of the N to-be-concatenated PDCP PDUs, and may further include sending time information. Alternatively, the concatenation indication includes one or more bitmaps, and bits on the bitmaps are used to indicate different concatenation parameters, for example, a quantity of to-be-concatenated data packets and a concatenation start identifier and a concatenation end identifier.

Specifically, for example, the concatenation indication includes the one or more bitmaps, where different values of bits on a part or all of the bitmaps respectively indicate the concatenation start identifier and the concatenation end identifier respectively. For example, a second data packet including the PDCP PDU 1 includes a first concatenation indication, and the first concatenation indication includes one bitmap. If a value of a bit on the bitmap is 1, the value indicates the concatenation start identifier, that is, the PDCP PDU 1 is a start part of concatenation. A second data packet including the PDCP PDU 2 (where the second data packet is different from the second data packet of the PDCP PDU 1) includes a second concatenation indication, and the second concatenation indication includes one bitmap. If a value of a bit on the bitmap is 0, the value indicates the concatenation end identifier, that is, the PDCP PDU 2 is an end part of concatenation. Correspondingly, after receiving the first concatenation indication, the secondary unit determines that the PDCP PDU 1 is a to-be-concatenated data packet. When the secondary unit receives another data packet whose sending time is the same as sending time of the PDCP PDU 1, and a concatenation indication of the data packet indicates that concatenation ends, the secondary unit performs concatenation processing. That is, after receiving the PDCP PDU 2 and the second concatenation instruction, the secondary unit performs concatenation processing on the PDCP PDU 1 and the PDCP PDU 2. For another example, if the concatenation indication is a total quantity of to-be-concatenated data packets, the secondary unit concatenates, based on the quantity, all PDCP PDUs that have a same time indication.

Optionally, if the secondary unit does not receive, within preset concatenation time after the secondary unit receives the concatenation indication, second data packets of the quantity indicated by the concatenation indication information, to avoid a problem of asynchronous transmission with another secondary unit, the secondary unit may discard a to-be-concatenated second data packet determined by the received concatenation indication. That is, to avoid a difference between data transmitted by the secondary unit and data transmitted by the another secondary unit, the secondary unit does not send the to-be-concatenated second data packet to the terminal.

It should be noted that the concatenation indication may be sent together with the PDCP PDU 1 and the first time information. That is, the concatenation indication may be carried in the second data packet sent by the main control unit to the secondary unit. In other words, the second data packet includes the PDCP PDU 1, the first time information, and the concatenation indication. Alternatively, the concatenation indication may be sent before the main control unit sends the PDCP PDU 1 and the first time information to the secondary unit. If the concatenation indication is sent before the PDCP PDU 1 and the first time information, the concatenation indication should include quantity information of PDCP PDUs that have same sending time and first time information. Alternatively, the concatenation indication may be sent with preset time after the main control unit sends the PDCP PDU 1 and the first time information corresponding to the PDCP PDU 1 to the secondary unit. Correspondingly, the secondary unit does not process the PDCP PDU 1 at the MAC layer within preset time after receiving the PDCP PDU 1 and the first time information.

Finally, for subsequent scheduling optimization, a resource waste caused because the secondary unit reserves a large quantity of time-frequency resources used to transmit MBMS service data but no MBMS service data needs to be sent is avoided. The first configuration information configured by the main control unit may further include second time information, where the second time information may be one or more pieces of moment information, information about a period of time, or duration information, and is used to indicate release time of the first time domain resource and/or the first frequency domain resource that are/is reserved by the secondary unit based on the first configuration information. The release time means that if the distributed unit releases a corresponding reserved time-frequency resource if the distributed unit does not receive the second data packet before preset time of each reserved time-frequency resource.

Figure 12:
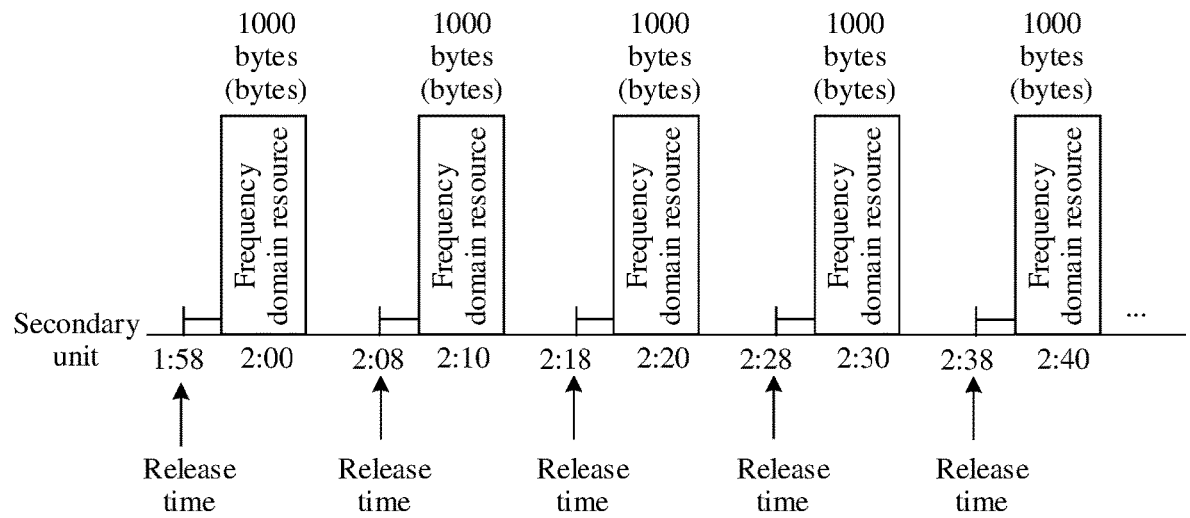
FIG. 12 is a schematic diagram of releasing reserved time-frequency resources according to an embodiment of this application.

For example, FIG. 12 is a schematic diagram of a scenario of releasing reserved time-frequency resources. Time domain resources (first time domain resources) reserved by the secondary unit based on the first configuration information include 2:00, 2:10, 2:20, 2:30, . . . , and first frequency domain resources corresponding to all first time domain resources can carry data of a same amount, to be specific, 1000 bytes. The secondary unit determines, based on the second time information included in the first configuration information, time used to determine whether to release the reserved time-frequency resources. It is assumed that the second time information included in the first configuration information is duration information, for example, two minutes. If the secondary unit does not receive the second data packet from the main control unit before 1:58, the secondary unit releases a frequency domain resource at 2:00, where release time may be 1:58, or may be time after 1:58 and before 2:00. The rule is applicable to the following cases. Details are not described again. Alternatively, if the secondary unit does not receive the second data packet from the main control unit before 2:08, the secondary unit releases a frequency domain resource at 2:10. Alternatively, if the secondary unit does not receive the second data packet from the main control unit before 2:18, the secondary unit releases a frequency domain resource at 2:20. The rest may be deduced by analogy. Contrarily, if the secondary unit receives the second data packet from the main control unit before 1:58, for example, 1:55, the secondary unit reserves a time-frequency resource corresponding to 12:10. If the secondary unit receives the second data packet from the main control unit before 2:08, for example, 12:59, the secondary unit reserves the time-frequency resource corresponding to 2:10. If the secondary unit receives the second data packet from the main control unit before 2:18, for example, 2:18, the secondary unit reserves the time-frequency resource corresponding to 2:20. The rest may be deduced by analogy.

It should be noted that, if the secondary unit determines, after receiving the second data packet from the main control unit at a moment, that a plurality of reserved time-frequency resources need to be used when the first data in the second data packet is sent, the plurality of reserved time-frequency resources are still not released even if no other second data packet is received subsequently. For example, if the secondary unit receives the second data packet and the first time information at 2:07, an amount of the data in the second data packet is 1500 bytes, and the sending time indicated by the first time information is 2:10, the secondary unit determines that it is required that the first part (for example, 1000 bytes) of the second data packet be sent at 2:10 and then the second part (500 bytes) of the second data packet be sent at 2:20. In this case, the reserved time-frequency resource at 2:20 is still not released even if the secondary unit does not receive another second data packet before 2:18.

Optionally, the secondary unit may further determine, based on the received first time information, whether to release the reserved time-frequency resources. For example, it is assumed that the secondary unit receives, at 2:05, the second data packet and the first time information that are sent by the main control unit, and then does not receive another second data packet before 2:08. If the sending time indicated by the first time information received by the secondary unit at 12:05 is not 12:10, the secondary unit may release the time-frequency resource at 12:10 in a period of time after 12:08 and before 12:10.

If the secondary unit determines to release a corresponding time-frequency resource, the secondary unit may use the released time-frequency resource to transmit data of another service. For example, if the secondary unit does not receive the second data packet before 1:58 and a reserved time-frequency resource is not occupied by the MBMS service data, the secondary unit may use the frequency domain resource at 2:00 to transmit non-MBMS service data.

For further scheduling optimization, the main control unit may further adjust, in time by using the grant information, the size of the first frequency domain resource reserved by the secondary unit. There are a plurality of manners of adjusting a frequency domain resource by using the grant information, and three manners are listed below:

Adjustment manner 1: The secondary unit adjusts, based on the grant information, a part of the first frequency domain resource configured based on the first configuration information.

The main control unit sends the grant information to the secondary unit. The grant information may include one or more pieces of second frequency domain resource information used to indicate the secondary unit to adjust, based on the grant information, the first frequency domain resource on the first time domain resource corresponding to the sending time indicated by the first time information, that is, only the corresponding first frequency domain resource on which the secondary unit sends the first data is adjusted. A specific adjustment procedure may include: The main control unit determines the grant information based on an amount of the first data and the size of the first frequency domain resource on the first time domain resource corresponding to the sending time indicated by the first time information of the first data. The grant information includes the second frequency domain resource information. The main control unit sends the grant information to the secondary unit, to indicate the secondary unit to adjust, based on the second frequency domain resource information, the first frequency domain resource corresponding to the first data.

For example, the secondary unit sends the first data by using two reserved time-frequency resources, and the grant information sent by the main control unit to the secondary unit includes two pieces of second frequency domain resource information. In this case, the second frequency domain resource information is in a one-to-one correspondence with the time-frequency resource for sending the first data. The time-frequency resources are time-frequency resources reserved based on the first configuration information. For example, the first piece of second frequency domain resource information is used to indicate the first time-frequency resource for sending the first data, and the second piece of second frequency domain resource information is used to indicate the second time-frequency resource for sending the first data. For another example, the secondary unit sends the first data by using two reserved time-frequency resources. The grant information sent by the main control unit to the secondary unit includes only one piece of second frequency domain resource information. The second frequency domain resource information may be used to indicate a frequency domain resource in the first or second (last) time-frequency resource for sending the first data.

Adjustment manner 2: Adjust all first frequency domain resources configured based on the first configuration information.

For example, the secondary unit reserves 10 first frequency domain resources based on the first configuration information, and an amount of data that can be carried by each first frequency domain resource is 1000 bytes. The main control unit sends the grant information to the secondary unit. The grant information includes one or more pieces of second frequency domain resource information. Assuming that the grant information includes one piece of second frequency domain resource information, and an amount of data that can be carried by a frequency domain resource indicated by the second frequency domain resource information is 600 bytes, the secondary unit adjusts, after receiving the grant information, all remaining first frequency domain resources (≤10) reserved based on the first configuration information to frequency domain resources carrying 600 bytes of data.

For another example, the secondary unit reserves 10 first frequency domain resources based on the first configuration information, and an amount of data that can be carried by each first frequency domain resource is 1000 bytes. The grant information sent by the main control unit to the secondary unit includes a plurality of second frequency domain resource information. Assuming that the grant information includes 10 pieces of second frequency domain resource information (where the first frequency domain resources configured by the secondary unit have not been used, that is, 10 first frequency domain resources remain), the secondary unit respectively adjusts the 10 reserved first frequency domain resources based on the 10 pieces of second frequency domain resource information included in the grant information, and may adjust the first frequency domain resource in a corresponding sequence based on a sequence of the second frequency domain resource information, or may adjust the corresponding first frequency domain resources based on numbers of the first frequency domain resources indicated by the second frequency domain resource information.

Adjustment manner 3: Adjust another frequency domain resource.

The grant information sent by the main control unit to the secondary unit is used to adjust a frequency domain resource corresponding to data of another service (non-MBMS service data), that is, a first frequency domain resource not configured based on the first configuration information.

The following describes Adjustment manner 1 in detail.

Figure 13:
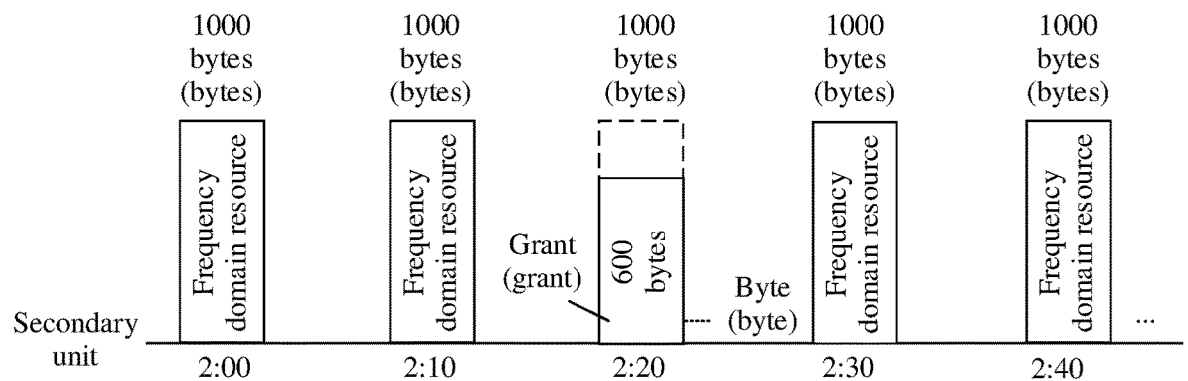
FIG. 13 is a schematic diagram of adjusting a reserved time-frequency resource according to an embodiment of this application.

For example, FIG. 13 shows the time-frequency resource configured based on the first configuration information. It is assumed that an amount of data in the second data packet sent by the main control unit to the secondary unit is 500 bytes, sending time indicated by the first time information of the second data packet is 2:20, and no other data packet has same sending time as the second data packet, that is, a frequency domain resource at 2:20 is only used to transmit the data in the second data packet. The frequency domain resource reserved at 2:20 can carry 1000 bytes of data, but a first data packet to be actually transmitted at 2:20 is only of 500 bytes. In other words, 500 bytes of reserved frequency domain resources (where the reserved time-frequency resources do not include physical layer overheads of the MAC PDU) are wasted. Therefore, the main control unit may indicate, by sending the grant information to the secondary unit, the secondary unit 2:20 to use a frequency domain resource configured in the grant information. For example, if the frequency domain resource indicated by the second frequency domain resource information included in the grant information can carry 500 bytes of data, the secondary unit adjusts the reserved frequency domain resource at 2:20 to a frequency domain value for carrying the 500 bytes of data. The grant information may further include a modulation scheme used when the frequency resource is used for transmission, for example, one or more of a coding rate and redundancy version information.

Figure 14:
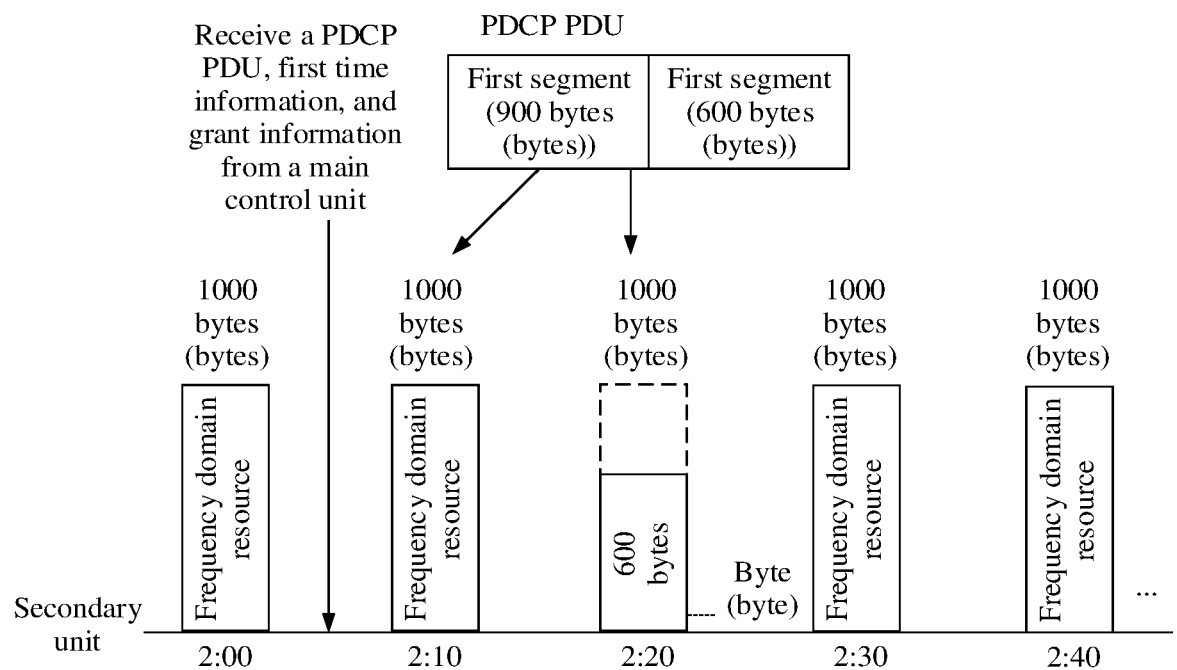
FIG. 14 is a schematic diagram of adjusting a reserved frequency domain resource based on grant information according to an embodiment of this application.

In another example, it is assumed that the second data packet includes a PDCP PDU, and an amount of data in the PDCP PDU is 1500 bytes. An amount of data that can be carried by each reserved frequency domain resource is 1000 bytes. In other words, the PDCP PDU needs to be segmented. In this case, the main control unit determines that grant information of the PDCP PDU may include a plurality of pieces of second frequency domain resource information, and each piece of second frequency domain resource information indicates a MAC PDU (a MAC PDU corresponding to each segment of the PDCP PDU) corresponding to each RLC segment that carries the PDCP PDU. Alternatively, the main control unit determines that grant information of the PDCP PDU includes one piece of second frequency domain resource information, and the second frequency domain resource information is used to indicate the last segment of the PDCP PDU (a MAC PDU corresponding to the last segment of the PDCP PDU). For example, the PDCP PDU is segmented based on a size of a reserved time-frequency resource, and a size of each segment is less than or equal to a size of the reserved time-frequency resource (where it should be understood that when the size of each segment is equal to the size of the reserved time-frequency resource, the reserved time-frequency resource does not include physical layer overheads of the MAC PDU). Assuming that a size of a MAC PDU corresponding to the first segment of the PDCP PDU is 1000 bytes, a size of a MAC PDU corresponding to the second segment (where the second segment is also the last segment of the PDCP PDU herein) of the PDCP PDU is 500 bytes. In this case, the grant information of the PDCP PDU may include two pieces of second frequency domain information, namely, a frequency domain resource 1 (carrying 1000 bytes) and a frequency domain resource 2 (carrying 500 bytes). Alternatively, the grant information of the PDCP PDU includes one piece of second frequency domain information, that is, 500 bytes. As shown in FIG. 14, the grant information is used to indicate a value of a frequency domain resource for transmitting the last segment of the PDCP PDU (where all segments before the last segment of the PDCP PDU are transmitted based on the reserved frequency domain resource, and no new frequency domain resource is specified for these segments). It should be noted that the value of the second frequency domain information is merely an example, and a manner of determining a segment of the PDCP PDU is not limited in this embodiment of this application. The value of the second frequency domain information may be the same as a value of each determined segment of the PDCP PDU, and a difference between the two values may also be within a specific threshold range.

In still another example, if the second data packet includes at least one MAC PDU, the MAC PDU does not need to be segmented after being transmitted to the secondary unit. Therefore, the MAC PDU may be in a one-to-one correspondence with the second frequency domain resource information in the grant information. It should be understood that if the second data packet includes one MAC PDU, the grant information includes one piece of second frequency domain resource information. If the second data packet includes a plurality of MAC PDUs, the grant information also includes a plurality of pieces of second frequency domain resource information, and each piece of second frequency domain resource information is in a one-to-one correspondence with each MAC PDU. For example, the second data packet includes one MAC PDU, an amount of data in the MAC PDU is 600 bytes, and an amount of data that can be carried by each reserved frequency domain resource is 1000 bytes. In this case, the main control unit determines that grant information of the MAC PDU includes one piece of second frequency domain resource information used to indicate the secondary unit to adjust, based on the second frequency domain resource information, a first frequency domain resource for sending the MAC PDU. Alternatively, the second data packet includes three MAC PDUs: a MAC PDU 1, a MAC PDU 2, and a MAC PDU 3, and the grant information includes three pieces of second frequency domain resource information. In this case, a possible case is that the $1^{st}$ second frequency domain resource corresponds to the MAC PDU 1, the $2^{nd}$ second frequency domain resource corresponds to the MAC PDU 2, and the $3^{rd}$ second frequency domain resource corresponds to the MAC PDU 3.

It should be noted that the grant information may be sent to the secondary unit together with the second data packet and the first time information, or a correspondence between a plurality of second data packets and corresponding second frequency domain resource information may be placed in same grant information for sending.

Optionally, if the main control unit in this embodiment of this application is a gNB or another functional module or network node that can directly communicate with the terminal, the main control unit may alternatively send the first data to the terminal by using the time domain resource corresponding to the sending time indicated by the first time information.

Based on the foregoing method, the main control unit processes the MBMS data packet at the PDCP layer, and specifies the first time information for each PDCP PDU. In this way, sending time of each PDCP PDU is independent, and a problem that the base station discards all data packets in a synchronization sequence if any data packet in the synchronization sequence is lost is avoided. In this embodiment of this application, each data packet has independent sending time, and is not affected by loss of a data packet. In addition, no SYNC protocol entity needs to be added to the main control unit, the secondary unit, and the core network device, so that a synchronous transmission process is simplified.

Through the foregoing two embodiments, the main control unit receives the MBMS data packet sent by the core network device, where no time stamp needs to be added to the MBMS data packet from the core network device. The main control unit determines, based on a time-frequency resource the same as that of the secondary unit, the sending time of the first data included in the data packet, and sends the first data included in the MBMS data packet and the first time information of the first data to the secondary unit. The first time information is used to indicate the sending time of the first data to the secondary unit. In other words, the first time information is used to indicate the time at which the secondary unit sends the first data to the terminal. In this embodiment of this application, the main control unit determines the first time information of the first data. In this way, no SYNC protocol entity needs to be added to the data source and base stations, and the base stations only need to send the first data based on the sending time indicated by the first time information, so that a synchronous transmission process is simplified. In addition, the main control unit processes the MBMS data packet at the PDCP layer or the MAC layer, so that a time-frequency resource can be used to a maximum extent. For example, if a currently remaining time-frequency resource is insufficient to transmit an entire data packet, a part of data (namely, the first data) in the data packet is configured to be sent on the time-frequency resource. Therefore, compared with the time stamp added by the data source to the MBMS data packet, the first time information of the first data is more precise, has a smaller granularity, and can be subdivided into a part of data in the MBMS data packet. Further, duration of data transmission between the main control unit and the secondary unit is less than duration of data transmission between the core network device and the base stations, so that the transmission latency is reduced.

In another implementation, an embodiment of this application provides another communication method. The method may be applied to the network architecture shown in FIG. 5.

Figure 15:
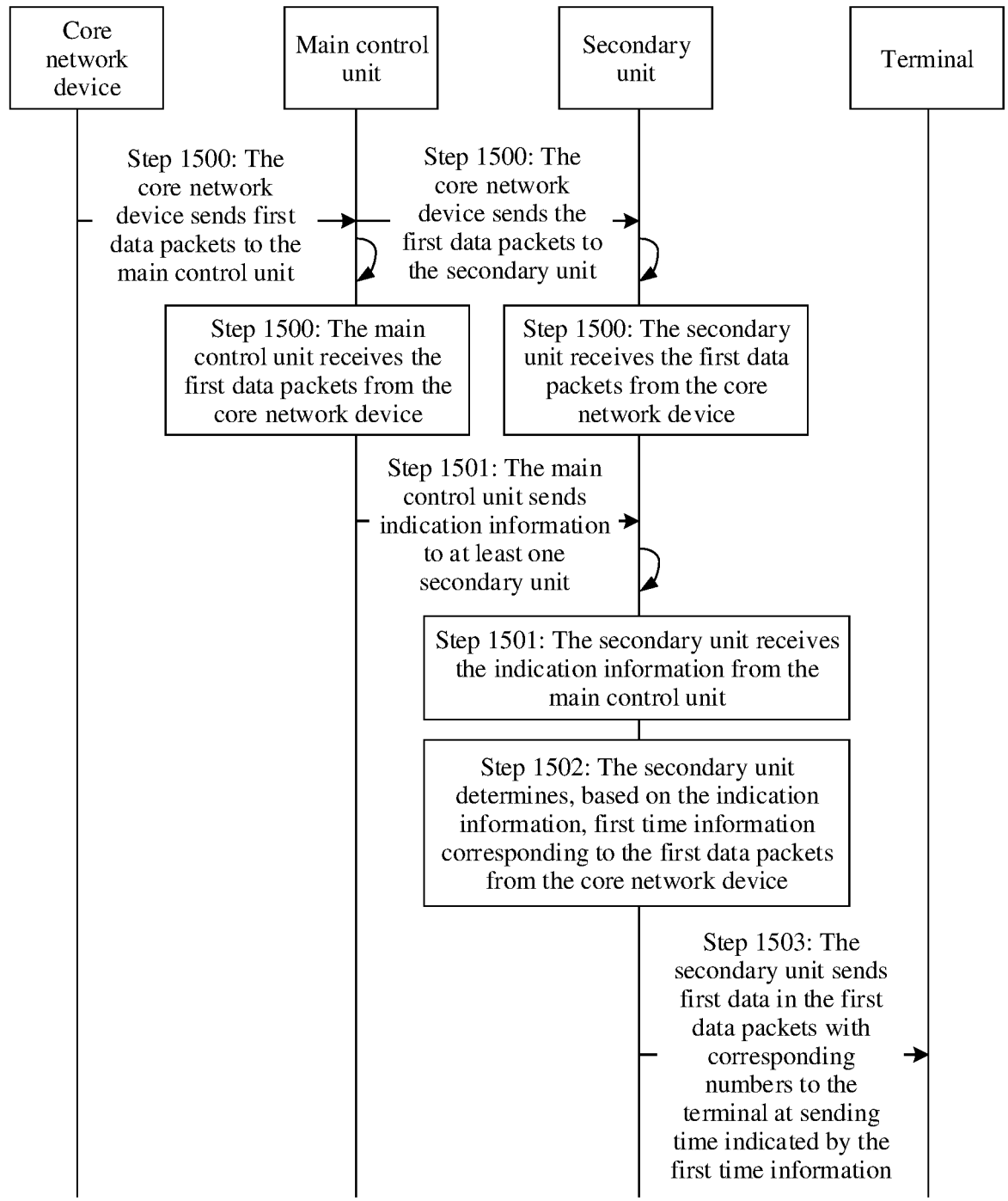
FIG. 15 is a schematic flowchart of another communication method according to an embodiment of this application.

Refer to FIG. 15. The following describes in detail a specific interaction process of the communication method in a second solution. As shown in FIG. 14, the process includes the following steps.

Step 1500: A main control unit receives first data packets sent by a core network device, where the first data packets include first data.

The core network device sends the first data packets to the main control unit and the secondary unit. In this embodiment, the main control unit does not need a secondary unit for which the main control unit is responsible (or that the main control unit manages) to send data in the first data packets. In addition, any first data packet sent by the core network device has a number, and no time stamp needs to be added to the first data packet.

Correspondingly, the main control unit receives the first data packets from the core network device. The first data packet herein may be an MBMS data packet or a data packet of another service.

It should be noted that, the manner of sending the first data packets, to be specific, sending the first data packets by the core network device is merely an example. If a data source BM-SC node does not forward the MBMS data packet by using the core network device, the main control unit or the secondary unit also uses, after receiving an MBMS data packet from another network device (or a network node), the procedure of processing the received MBMS data packet from the core network device by the main control unit, to perform a subsequent corresponding operation. Details are not described herein again.

Step 1501: The main control unit sends indication information to at least one secondary unit.

The indication information is used to indicate a correspondence between numbers of the first data packets and first time information, where the first time information is used to indicate, to the secondary unit, sending time of first data included in a first data packet with a corresponding number.

The main control unit receives the plurality of first data packets from the core network device. For any first data packet, the main control unit may determine a correspondence between the first data packets and the first time information based on the method steps, listed in FIG. 6, for determining the first time information of the first data in the first data packet.

Step 1502: The secondary unit determines, based on the indication information and the numbers of the first data packets received from the core network device, the first time information corresponding to the first data packets with the numbers.

The secondary unit receives the indication information from the main control unit. The indication information may be the correspondence between the numbers of the first data packets and the first time information, or may include the correspondence. Alternatively, the indication information includes at least one piece of sending indication information, and each piece of sending indication information is used to indicate the secondary unit to send first data in first data packets at sending time indicated by first time information corresponding to numbers of different data packets. For example, it is assumed that numbers of time-frequency resources reserved by the secondary unit based on first configuration information include a, b, c, and d. The indication information received by the secondary unit from the main control unit includes three pieces of sending indication information, where one piece of sending indication information indicates the secondary unit to send data in a data packet with a number 1 to a terminal by using the reserved time-frequency resource with the number a, another piece of sending indication information indicates the secondary unit to send data in a data packet with a number 2 to the terminal by using the reserved time-frequency resource with the number b, and the third sending indication information indicates the secondary unit to send data in a data packet with a number 3 to the terminal by using a reserved time-frequency resource with a number f.

It should be noted that the indication information in this embodiment of this application is different from concatenation indication information, and the indication information and the concatenation indication information indicate different content. In an optional scenario, the indication information may include the concatenation indication information.

Step 1503: The secondary unit sends the first data in the first data packets with the corresponding numbers to the terminal at the sending time indicated by the first time information.

The secondary unit receives the first data packets from the core network device. It should be noted that, for step 1500 and step 1502, the secondary unit receives the first data packets and receives the indication information from the main control unit in no sequence limitation. To be specific, it does not mean that the secondary unit can receive the first data packets of the core network device only after the main control unit first sends the indication information to the secondary unit, and it does not mean that the secondary unit first receives the first data packets of the core network device and then receives the indication information sent by the main control unit. For example, if it takes a long time for the core network device to transmit the first data packets to the secondary unit, the secondary unit may first receive the indication information from the main control unit.

The main control unit determines, based on the received indication information and the numbers of the received first data packets, the first time information corresponding to the first data packets with the numbers, and sends the first data in the first data packets with the numbers to the terminal at the sending time indicated by the first time information.

The following describes different implementation methods of the embodiment shown in FIG. 15.

Figure 16:
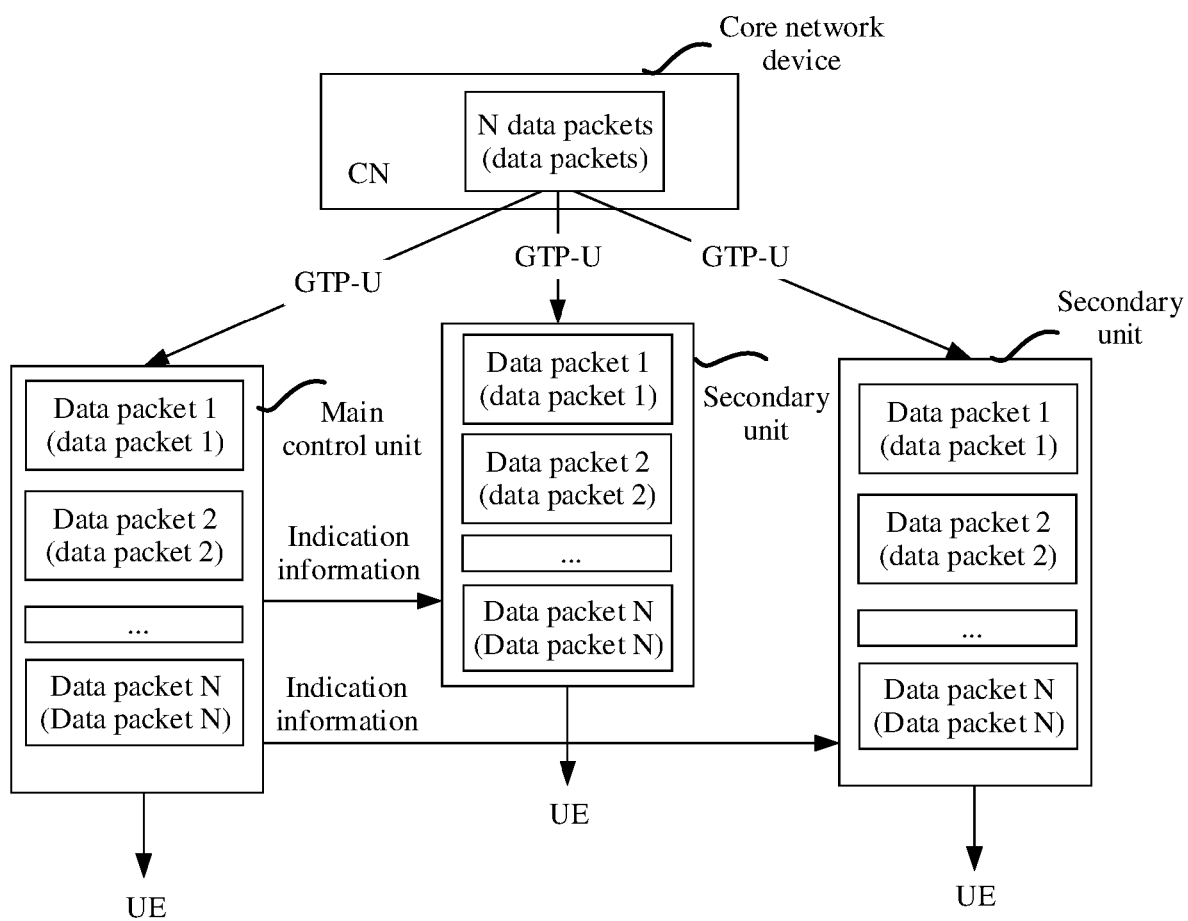
FIG. 16 is a schematic block diagram 3 of data transmission of a network architecture according to an embodiment of this application.

In an implementable example, as shown in FIG. 16, the core network device sends first data packets to the main control unit and the secondary unit. The first data packets have data packet numbers. For example, the numbers of the first data packets sent by the core network device are 1, 2, 3, 4, . . . . After receiving the first data packets from the core network device, the main control unit determines first time information of each first data packet, and sends indication information including a correspondence between the numbers of the first data packets and the first time information to the secondary unit.

In this embodiment, for a manner in which the main control unit determines the first time information and a manner in which the main control unit determines the first configuration information, refer to the method steps in the specific description part of the method shown in FIG. 6. Details are not described herein again.

For example, in this embodiment, the main control unit and the secondary unit have a same reserved time-frequency resource. The main control unit sends the first configuration information to the secondary unit, where the first configuration information includes information about a first time domain resource. The secondary unit configures the first time domain resource based on the first configuration information. The first configuration information may further include information about a first frequency domain resource. The secondary unit configures the first frequency domain resource based on the first configuration information. Optionally, the first configuration information may further include second time information. The second time information is used to indicate the secondary unit to release the reserved first time domain resource and/or first frequency domain resource if the secondary unit does not receive, before preset time indicated by the second time information, a first data packet sent by using the time-frequency resource.

The following describes in detail a process in which the main control unit determines the correspondence.

The correspondence in this embodiment of this application may be a correspondence between numbers of a group of data packets and first time information, or may be a correspondence between numbers of a plurality of groups of data packets and first time information.

Figure 17:
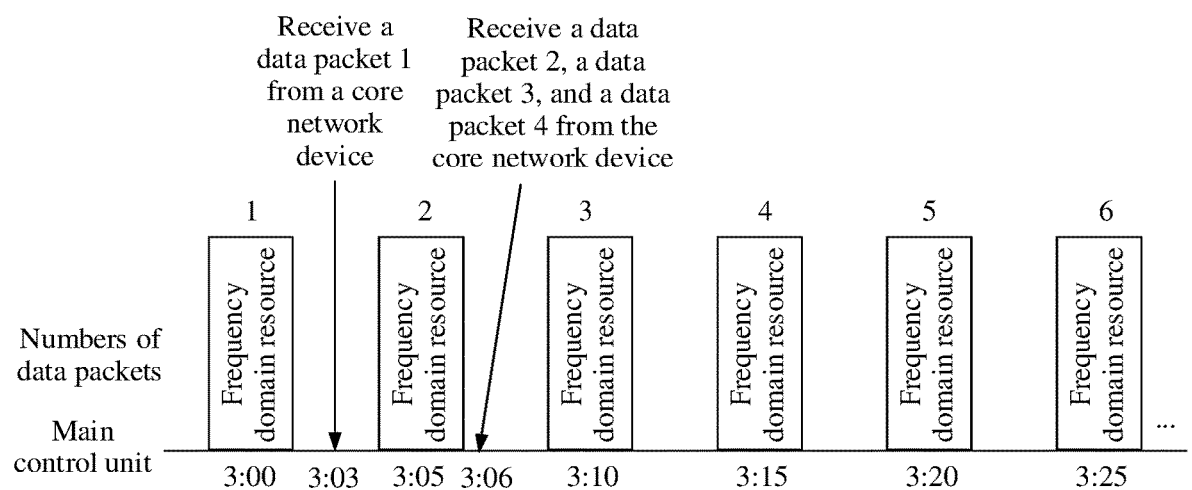
FIG. 17 is a schematic diagram of a scenario of receiving first data packets from a core network device according to an embodiment of this application.

For example, FIG. 17 is a schematic diagram of time-frequency resources reserved by the main control unit and the secondary unit based on the first configuration information. Digits above frequency domain resources represent numbers of the time-frequency resources. Assuming that the main control unit receives one first data packet from the core network device at 3:03, and a number of the data packet is 1 (which is briefly referred to as a data packet 1 below), the main control unit determines that the secondary unit may use a reserved time-frequency resource at 3:05 to send first data in the data packet 1. In this case, sending time identified by first time information of the data packet 1 may be 3:05. The correspondence includes the number 1 of the data packet and 3:05. The correspondence in this embodiment of this application has a plurality of representation manners. The following lists several representation manners. Table 1 is a schematic diagram of the foregoing correspondence according to an embodiment of this application.

TABLE 1

| Data packet number | First time information |
|---|---|
| 1 | 3:05 |

Table 2 is a schematic diagram of another correspondence above according to an embodiment of this application.

TABLE 2

| Data packet number | First time information (number of a reserved time-frequency resource) |
|---|---|
| 1 | 2 |

The first time information included in the foregoing table is merely an example, and the first time information may further include a frame number of a radio frame and a slot number.

If the main control unit sends indication information including the correspondence to the secondary unit, the secondary unit determines, based on the indication information, that sending time of a first data packet with a number 1 from the core network device is 3:05, and the secondary unit sends first data in the first data packet at 3:05. If a frequency domain resource at 3:05 can completely send the data in the first data packet, the first data is all data in the first data packet. If a frequency domain resource at 3:05 cannot completely send the data in the first data packet once, the first data sent at 3:05 is a part of data in the first data packet.

In another example, it is assumed that the main control unit sequentially receives, at 3:06, first data packets with numbers 2, 3, and 4 (which are briefly referred to as a data packet 2, a data packet 3, and a data packet 4 below) from the core device, and determines that data packet 2 needs to be transmitted by using two reserved time-frequency resources and that a sum of amounts of data in the data packet 3 and the data packet 4 is less than an amount of data that can be carried by a reserved time-frequency resource. The main control unit determines that the secondary unit may send first data in the data packet 2 by using reserved time-frequency resources at 3:10 and 3:15, and send first data in the data packet 3 and first data in the data packet 4 by using a reserved time-frequency resource at 3:20. The correspondence determined by the main control unit is shown in Table 3.

TABLE 3

| Data packet number | First time information |
|---|---|
| 2 | 3:10 |
| 3 | 3:20 |
| 4 | 3:20 |

Optionally, the correspondence may further include another item, for example, grant information. For a description of the grant information, refer to specific descriptions of related parts in the foregoing embodiment. Details are not described herein again. The following uses Table 3 as an example, and the grant information is added to Table 3 to form Table 4.

TABLE 4

| Data packet number | First time information | Grant information |
|---|---|---|
| 2 | 3:10 | |
|   | 3:15 | 500 bytes (second frequency domain information) |
| 3 | 3:20 | |
| 4 | 3:20 | |

After receiving the indication information, the secondary unit adjusts, according to an indication of the indication information, a size of the first frequency domain resource reserved at 3:15 to a frequency domain resource that can carry 500 bytes of data. It should be noted that, that no grant information item is added to Table 4 may indicate that no reserved frequency domain resource needs to be adjusted.

Optionally, with reference to Table 3 or Table 4, it can be learned that sending time of the data packet 3 is the same as sending time of the data packet 4. Therefore, the secondary unit may encapsulate the data packet 3 and the data packet 4 into one MAC PDU, and send the MAC PDU to the terminal through a physical layer. Alternatively, the secondary unit may generate a MAC PDU 3 corresponding to the data packet 3 and a MAC PDU 4 corresponding to the data packet 4, and send the MAC PDU 3 and the MAC PDU 4 to the terminal simultaneously through the physical layer.

Further, the main control unit may further send a concatenation indication to the secondary unit, where the concatenation indication may include the numbers of the first data packets, or sending time and a quantity of first data packets at the sending time. The secondary unit concatenates received first data packet according to the concatenation indication, to generate a corresponding MAC PDU.

Based on the foregoing method, the main control unit and the secondary unit receive the MBMS data packet sent by the core network device. After the main control unit determines the first time information of the first data in the MBMS data packet, the main control unit may send information (the indication information) about the correspondence between the number of the data packet and the first time information of the first data to the secondary unit. The secondary unit receives the indication information sent by the main control unit, determines, based on the indication information, the first time information corresponding to the number of the data packet, and sends, based on the sending time indicated by the first time information, the first data in the first data packet with the corresponding number. In this way, the main control unit does not need to send a specific MBMS data packet to the secondary unit, so that transmission load of a network interface between the main control unit and the secondary unit is reduced, and a technical effect same as that in the first possible solution can be achieved. In this way, a synchronous transmission process is simplified, a disadvantage of an existing manner is overcome, and applicability is high.

Figure 18:
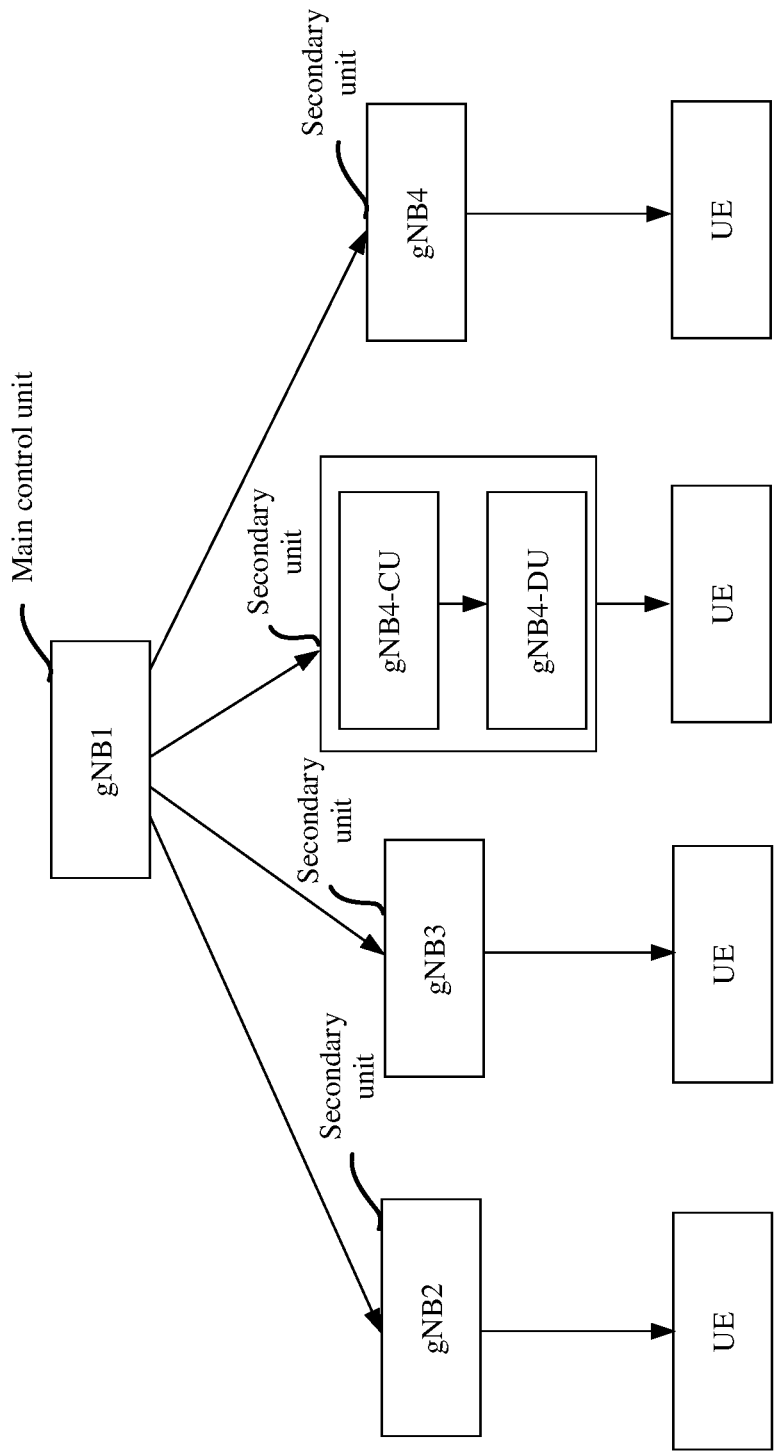
FIG. 18 is a schematic diagram 2 of a network architecture applicable to an embodiment of this application.

It should be noted that this embodiment of this application may alternatively be applied to a network architecture shown in FIG. 18. The network architecture includes a main control unit and at least one secondary unit. The main control unit, namely, a gNB1, shown in FIG. 18 is equivalent to the main control unit, namely, the gNB1-CU, in FIG. 5, and the secondary unit shown in FIG. 18 is equivalent to the secondary unit in FIG. 5. The main control unit in FIG. 18 may perform the function of the main control unit in FIG. 5 in the embodiment described in FIG. 6 or FIG. 15, and the secondary unit in FIG. 18 may perform the function of the secondary unit in FIG. 5 in the embodiment described in FIG. 6 or FIG. 15. For a specific execution step, refer to the description in the foregoing embodiment. Details are not described herein again.

The following describes, with reference to the accompanying drawings, apparatuses configured to implement the foregoing methods in embodiments of this application. Therefore, all the foregoing content may be used in the following embodiments. Repeated content is not described again.

Figure 19:
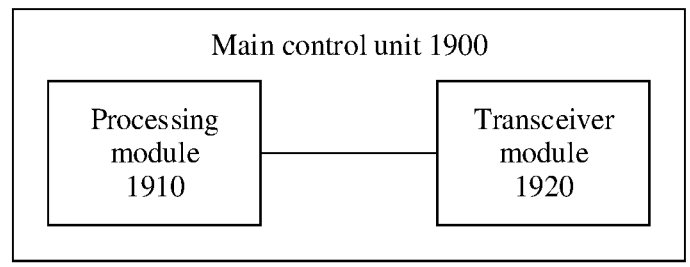
FIG. 19 is a schematic block diagram of a first main control unit according to an embodiment of this application.

FIG. 19 is a schematic block diagram of a communication apparatus 1900 according to an embodiment of this application. For example, the communication apparatus 1900 is, for example, a main control unit 1900. Alternatively, the communication apparatus 1900 is, for example, a chip in a communication device, or a combined device or a component that has the function of the main control unit in the communication device. For example, the communication device 1900 is a main control unit 1900.

The main control unit 1900 includes a processing module 1910. Optionally, the main control unit 1900 may further include a transceiver module 1920. When the main control unit 1900 is a network device, the transceiver module 1920 may be a transceiver, and may include an antenna, a radio frequency circuit, and the like, and the processing module 1910 may be a processor, for example, a baseband processor. The baseband processor may include one or more central processing units (CPU). When the communication apparatus 1900 is a component having the function of the terminal, the transceiver module 1920 may be a radio frequency unit, and the processing module 1910 may be a processor, for example, a baseband processor. When the main control unit 1900 is a chip system, the transceiver module 1920 may be an input/output interface of the chip system (for example, a baseband chip), and the processing module may be a processor of the chip system, and may include one or more central processing units.

The processing module 1910 may be configured to perform all operations performed by the main control unit in the embodiment shown in FIG. 6 other than sending and receiving operations, for example, determine first time information, and/or configured to support another process of the technology described in this specification. The transceiver module 1920 may be configured to perform all sending and receiving operations performed by the main control unit in the embodiment shown in FIG. 6, for example, step 600, and/or configured to support another process of the technology described in this specification.

In addition, the transceiver module 1920 may be one function module, and the function module can implement both a sending operation and a receiving operation. For example, the transceiver module 1920 may be configured to perform all sending operations and receiving operations performed by the main control unit in the embodiment shown in FIG. 6. For example, when a sending operation is performed, it may be considered that the transceiver module 1920 is a sending module; when a receiving operation is performed, it may be considered that the transceiver module 1920 is a receiving module. Alternatively, the transceiver module 1920 may be a general term of two function modules, and the two function modules are a sending module and a receiving module. The sending module is configured to implement a sending operation. For example, the sending module may be configured to perform all the sending operations performed by the main control unit in the embodiment shown in FIG. 6. The receiving module is configured to implement a receiving operation. For example, the receiving module may be configured to perform all the receiving operations performed by the main control unit in the embodiment shown in FIG. 6.

For example, the processing module 1910 is configured to determine first time information, and control the transceiver module 1920 to receive a first data packet from a core network device or send first data and the first time information to at least one secondary unit.

In an optional implementation, the transceiver module 1920 is configured to receive the first data packet from the core network device, where the first data packet includes the first data; and send the first data and the first time information to the at least one secondary unit, where the first time information is used to indicate sending time of the first data to the at least one secondary unit.

In an optional implementation, the transceiver module 1920 may be specifically configured to send a second data packet to the at least one secondary unit, where the second data packet includes the first data, and the second data packet is obtained by processing the first data packet.

In an optional implementation, the transceiver module 1920 is further configured to send first configuration information to the at least one secondary unit, where the first configuration information is used to configure a first time domain resource, and the sending time of the first data is included in the first time domain resource.

In an optional implementation, the first configuration information further includes second time information, and the second time information is used to indicate release time of a first frequency domain resource corresponding to the first time domain resource.

In an optional implementation, the second data packet includes a PDCP PDU or at least one MAC PDU.

In an optional implementation, the transceiver module 1920 may be specifically configured to send, to the at least one secondary unit, grant information including second frequency domain resource information, where the second frequency domain resource information is used to indicate a frequency domain resource corresponding to the first data.

In an optional implementation, if the second data packet includes the PDCP PDU, the grant information includes at least one piece of second frequency domain resource information, the at least one piece of second frequency domain resource information corresponds to at least one MAC PDU, and the at least one MAC PDU corresponds to the PDCP PDU; or if the second data packet includes the at least one MAC PDU, second frequency domain resource information included in grant information corresponding to each of the at least one MAC PDU corresponds to the MAC PDU.

In an optional implementation, the transceiver module 1920 is further configured to send concatenation indication information to the at least one secondary unit, where the concatenation indication information is used to indicate that the second data packet and at least one fourth data packet are concatenated, the at least one fourth data packet includes at least one piece of second data, and the sending time of the first data is the same as sending time of the at least one piece of second data.

In an optional implementation, if the second data packet includes the PDCP PDU, the first time information is used to indicate sending time of the first MAC PDU corresponding to the PDCP PDU; or if the second data packet includes the at least one MAC PDU, the first time information is used to indicate sending time of the at least one MAC PDU.

In an optional implementation, the first time information includes a frame number of a radio frame and a slot number; or the first time information is a number of the first time domain resource.

It should be understood that the processing module 1910 in this embodiment of this application may be implemented by a processor or a processor-related circuit component, and the transceiver module 1920 may be implemented by a transceiver or a transceiver-related circuit component.

Figure 20:
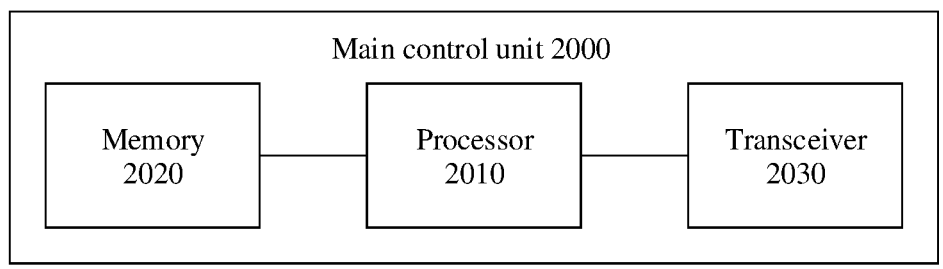
FIG. 20 is another schematic block diagram of a first main control unit according to an embodiment of this application.

As shown in FIG. 20, an embodiment of this application further provides a communication apparatus 2000. For example, the communication apparatus 2000 is, for example, a main control unit 2000. Alternatively, the communication apparatus 2000 is, for example, a chip in a communication device, or a combined device or a component that has the function of the main control unit in the communication device. For example, the communication device is, for example, a main control unit, or may be a chip system. The communication apparatus 2000 includes a processor 2010, a memory 2020, and a transceiver 2030. The memory 2020 stores instructions or a program. The processor 2010 is configured to execute the instructions or the program stored in the memory 2020. When the instructions or the program stored in the memory 2020 is executed, the processor 2010 is configured to perform the operations performed by the processing module 1910 in the foregoing embodiment, and the transceiver 2030 is configured to perform the operations performed by the transceiver module 1920 in the foregoing embodiment.

The transceiver 2030 may be one function unit, and the function unit can implement both a sending operation and a receiving operation. For example, the transceiver 2030 may be configured to perform all sending operations and receiving operations performed by the main control unit in the embodiment shown in FIG. 6. For example, when a sending operation is performed, it may be considered that the transceiver 2030 is a transmitter; when a receiving operation is performed, it may be considered that the transceiver 2030 is a receiver. Alternatively, the transceiver 2030 may be a general term of two function units, and the two function units are a transmitter and a receiver. The transmitter is configured to implement a sending operation. For example, the transmitter may be configured to perform all the sending operations performed by the main control unit in the embodiment shown in FIG. 6. The receiver is configured to implement a receiving operation. For example, the receiver may be configured to perform all the receiving operations performed by the main control unit in the embodiment shown in FIG. 6.

It should be understood that the communication apparatus 1900 or the communication apparatus 2000 in embodiments of this application may implement the function of the main control unit in the embodiment shown in FIG. 6, and operations and/or functions of the modules in the communication apparatus 1900 or the communication apparatus 2000 are intended to implement corresponding procedures in the embodiment shown in FIG. 6. For brevity, details are not described herein again.

Figure 21:
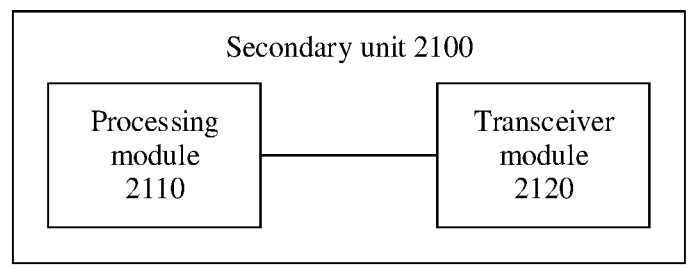
FIG. 21 is a schematic block diagram of a first secondary unit according to an embodiment of this application.

FIG. 21 is a schematic block diagram of a communication apparatus 2100 according to an embodiment of this application. For example, the communication apparatus 2100 is, for example, a secondary unit 2100. Alternatively, the communication apparatus 2100 is, for example, a chip in a communication device, or a combined device or a component that has the function of the secondary unit in the communication device. For example, the communication device 2100 is a secondary unit 2100.

The secondary unit 2100 includes a processing module 2110. Optionally, the secondary unit 2100 may further include a transceiver module 2120. When the secondary unit 2100 is a network device, the transceiver module 2120 may be a transceiver, and may include an antenna, a radio frequency circuit, and the like, and the processing module 2110 may be a processor, for example, a baseband processor. The baseband processor may include one or more central processing units (CPU). When the communication apparatus 2100 is a component having the function of the terminal, the transceiver module 2120 may be a radio frequency unit, and the processing module 2110 may be a processor, for example, a baseband processor. When the secondary unit 2100 is a chip system, the transceiver module 2120 may be an input/output interface of the chip system (for example, a baseband chip), and the processing module may be a processor of the chip system, and may include one or more central processing units.

The processing module 2110 may be configured to perform all operations performed by the secondary unit in the embodiment shown in FIG. 6 other than sending and receiving operations, for example, configured to support another process of the technology described in this specification. The transceiver module 2120 may be configured to perform all sending and receiving operations performed by the secondary unit in the embodiment shown in FIG. 6, for example, step 602, and/or configured to support another process of the technology described in this specification.

In addition, the transceiver module 2120 may be one function module, and the function module can implement both a sending operation and a receiving operation. For example, the transceiver module 2120 may be configured to perform all sending operations and receiving operations performed by the secondary unit in the embodiment shown in FIG. 6. For example, when a sending operation is performed, it may be considered that the transceiver module 2120 is a sending module; when a receiving operation is performed, it may be considered that the transceiver module 2120 is a receiving module. Alternatively, the transceiver module 2120 may be a general term of two function modules, and the two function modules are a sending module and a receiving module. The sending module is configured to implement a sending operation. For example, the sending module may be configured to perform all the sending operations performed by the secondary unit in the embodiment shown in FIG. 6. The receiving module is configured to implement a receiving operation. For example, the receiving module may be configured to perform all the receiving operations performed by the secondary unit in the embodiment shown in FIG. 6.

For example, the processing module 2110 is configured to control the transceiver module 2120 to receive first data and first time information that are sent by a main control unit, and control the transceiver module 2120 to send the first data to a terminal at sending time.

In an optional implementation, the transceiver module 2120 is configured to receive the first data and the first time information that are sent by the main control unit, where the first time information is used to indicate the sending time of the first data; and send the first data to the terminal at the sending time.

In an optional implementation, the transceiver module 2120 may be specifically configured to receive a second data packet sent by the main control unit, where the second data packet includes the first data.

In an optional implementation, the transceiver module 2120 is further configured to receive first configuration information sent by the main control unit, where the first configuration information is used to configure a first time domain resource, and the sending time of the first data is included in the first time domain resource.

In an optional implementation, the first configuration information further includes second time information, and the second time information is used to indicate release time of a first frequency domain resource corresponding to the first time domain resource.

In an optional implementation, the second data packet includes a PDCP PDU or at least one MAC PDU.

In an optional implementation, the transceiver module 2120 may be specifically configured to receive grant information that is sent by the main control unit and that includes second frequency domain resource information, where the second frequency domain resource information is used to indicate a frequency domain resource corresponding to the first data.

In an optional implementation, if the second data packet includes the PDCP PDU, the grant information includes at least one piece of second frequency domain resource information, the at least one piece of second frequency domain resource information corresponds to at least one MAC PDU, and the at least one MAC PDU corresponds to the PDCP PDU; or if the second data packet includes the at least one MAC PDU, second frequency domain resource information included in grant information corresponding to each of the at least one MAC PDU corresponds to the MAC PDU.

In an optional implementation, the transceiver module 2120 may be specifically configured to receive concatenation indication information sent by the main control unit, where the concatenation indication information is used to indicate that the second data packet and at least one fourth data packet are concatenated, the at least one fourth data packet includes at least one piece of second data, and the sending time of the first data is the same as sending time of the at least one piece of second data.

In an optional implementation, if the second data packet includes the PDCP PDU, the first time information is used to indicate sending time of the first MAC PDU corresponding to the PDCP PDU; or if the second data packet includes the at least one MAC PDU, the first time information is used to indicate sending time of the at least one MAC PDU.

In an optional implementation, the first time information includes a frame number of a radio frame and a slot number; or the first time information is a number of the first time-frequency resource.

Figure 22:
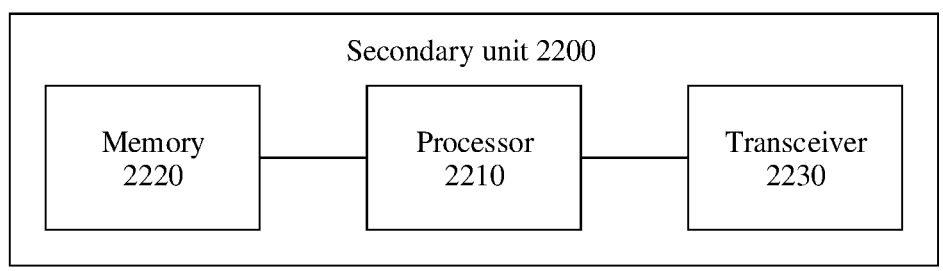
FIG. 22 is another schematic block diagram of a first secondary unit according to an embodiment of this application.

As shown in FIG. 22, an embodiment of this application further provides a communication apparatus 2200. For example, the communication apparatus 2200 is, for example, a secondary unit 2200. Alternatively, the communication apparatus 2200 is, for example, a chip in a communication device, or a combined device or a component that has the function of the secondary unit in the communication device. For example, the communication device is network device or a chip system. The communication apparatus 2300 includes a processor 2210, a memory 2220, and a transceiver 2230. The memory 2220 stores instructions or a program. The processor 2210 is configured to execute the instructions or the program stored in the memory 2220. When the instructions or the program stored in the memory 2220 is executed, the processor 2210 is configured to perform the operations performed by the processing module 2110 in the foregoing embodiment, and the transceiver 2230 is configured to perform the operations performed by the transceiver module 2120 in the foregoing embodiment.

The transceiver 2230 may be one function unit, and the function unit can implement both a sending operation and a receiving operation. For example, the transceiver 2230 may be configured to perform all sending operations and receiving operations performed by the secondary unit in the embodiment shown in FIG. 6. For example, when a sending operation is performed, it may be considered that the transceiver 2230 is a transmitter; when a receiving operation is performed, it may be considered that the transceiver 2230 is a receiver. Alternatively, the transceiver 2230 may be a general term of two function units, and the two function units are a transmitter and a receiver. The transmitter is configured to implement a sending operation. For example, the transmitter may be configured to perform all the sending operations performed by the secondary unit in the embodiment shown in FIG. 6. The receiver is configured to implement a receiving operation. For example, the receiver may be configured to perform all the receiving operations performed by the secondary unit in the embodiment shown in FIG. 6.

It should be understood that the communication apparatus 2100 or the communication apparatus 2200 in embodiments of this application may implement the function of the secondary unit in the embodiment shown in FIG. 6, and operations and/or functions of the modules in the communication apparatus 2100 or the communication apparatus 2200 are intended to implement corresponding procedures in the embodiment shown in FIG. 6. For brevity, details are not described herein again.

Figure 23:
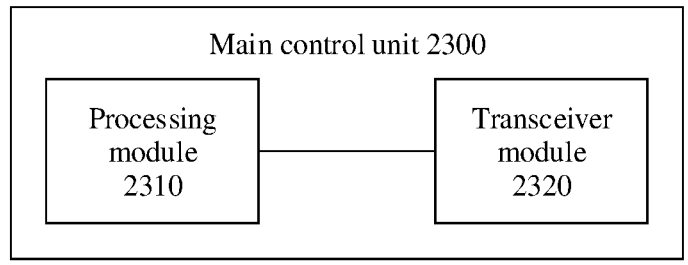
FIG. 23 is a schematic block diagram of a second main control unit according to an embodiment of this application.

FIG. 23 is a schematic block diagram of a communication apparatus 2300 according to an embodiment of this application. For example, the communication apparatus 2300 is, for example, a main control unit 2300. Alternatively, the communication apparatus 2300 is, for example, a chip in a communication device, or a combined device or a component that has the function of the main control unit in the communication device. For example, the communication device 2300 is a main control unit 2300.

The main control unit 2300 includes a processing module 2310. Optionally, the main control unit 2300 may further include a transceiver module 2320. When the main control unit 2300 is a network device, the transceiver module 2320 may be a transceiver, and may include an antenna, a radio frequency circuit, and the like, and the processing module 2310 may be a processor, for example, a baseband processor. The baseband processor may include one or more central processing units (CPU). When the communication apparatus 2300 is a component having the function of the terminal, the transceiver module 2320 may be a radio frequency unit, and the processing module 2310 may be a processor, for example, a baseband processor. When the main control unit 2300 is a chip system, the transceiver module 2320 may be an input/output interface of the chip system (for example, a baseband chip), and the processing module may be a processor of the chip system, and may include one or more central processing units.

The processing module 2310 may be configured to perform all operations performed by the main control unit in the embodiment shown in FIG. 15 other than sending and receiving operations, for example, determine first time information, and/or configured to support another process of the technology described in this specification. The transceiver module 2320 may be configured to perform all sending and receiving operations performed by the main control unit in the embodiment shown in FIG. 15, for example, step 1500, and/or configured to support another process of the technology described in this specification.

In addition, the transceiver module 2320 may be one function module, and the function module can implement both a sending operation and a receiving operation. For example, the transceiver module 2320 may be configured to perform all sending operations and receiving operations performed by the main control unit in the embodiment shown in FIG. 15. For example, when a sending operation is performed, it may be considered that the transceiver module 2320 is a sending module; when a receiving operation is performed, it may be considered that the transceiver module 2320 is a receiving module. Alternatively, the transceiver module 2320 may be a general term of two function modules, and the two function modules are a sending module and a receiving module. The sending module is configured to implement a sending operation. For example, the sending module may be configured to perform all the sending operations performed by the main control unit in the embodiment shown in FIG. 15. The receiving module is configured to implement a receiving operation. For example, the receiving module may be configured to perform all the receiving operations performed by the main control unit in the embodiment shown in FIG. 15.

For example, the processing module 2310 is configured to control the transceiver module 2320 to receive first data packets from a core network device, and send indication information to at least one secondary unit.

In an optional implementation, the transceiver module 2320 is configured to receive the first data packets from the core network device, where the first data packets include first data; and send the indication information to the at least one secondary unit, where the indication information is used to indicate a correspondence between number of the first data packets and first time information of the first data packets, and the first time information is used to indicate sending time of the first data to the at least one secondary unit.

In an optional implementation, the transceiver module 2320 may be specifically configured to send first configuration information to the at least one secondary unit, where the first configuration information is used to configure a first time domain resource, and sending time of the first data packet is included in the first time domain resource.

In an optional implementation, the first configuration information further includes second time information, and the second time information is used to indicate release time of a first frequency domain resource corresponding to the first time domain resource.

In an optional implementation, the transceiver module 2320 may be specifically configured to send, to the at least one secondary unit, grant information including second frequency domain resource information, where the second frequency domain resource information is used to indicate a frequency domain resource corresponding to the first data.

In an optional implementation, the transceiver module 2320 may be specifically configured to send concatenation indication information to the at least one secondary unit, where the concatenation indication information is used to indicate that the first data packet and at least one fourth data packet are concatenated, and the sending time of the first data packet is the same as sending time of the at least one fourth data packet.

In an optional implementation, the first time information is used to indicate sending time of the first MAC PDU corresponding to the first data packet.

In an optional implementation, the first time information includes a frame number of a radio frame and a slot number; or the first time information is a number of the first time-frequency resource.

It should be understood that the processing module 2310 in this embodiment of this application may be implemented by a processor or a processor-related circuit component, and the transceiver module 2320 may be implemented by a transceiver or a transceiver-related circuit component.

Figure 24:
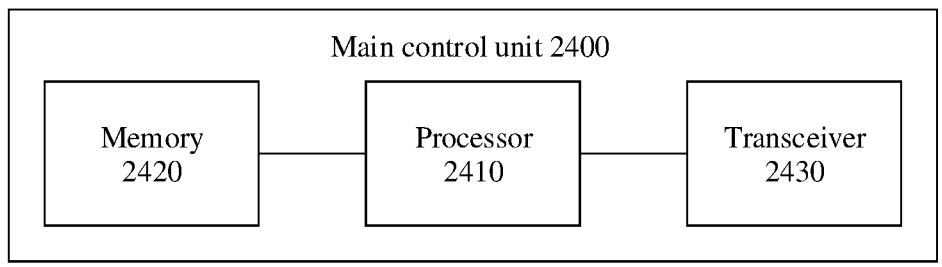
FIG. 24 is another schematic block diagram of a second main control unit according to an embodiment of this application.

As shown in FIG. 24, an embodiment of this application further provides a communication apparatus 2400. For example, the communication apparatus 2400 is, for example, a main control unit 2400. Alternatively, the communication apparatus 2400 is, for example, a chip in a communication device, or a combined device or a component that has the function of the main control unit in the communication device. For example, the communication device is, for example, a main control unit, or may be a chip system. The main control unit 2400 includes a processor 2410, a memory 2420, and a transceiver 2430. The memory 2420 stores instructions or a program. The processor 2410 is configured to execute the instructions or the program stored in the memory 2420. When the instructions or the program stored in the memory 2420 is executed, the processor 2410 is configured to perform the operations performed by the processing module 2310 in the foregoing embodiment, and the transceiver 2430 is configured to perform the operations performed by the transceiver module 2320 in the foregoing embodiment.

The transceiver 2430 may be one function unit, and the function unit can implement both a sending operation and a receiving operation. For example, the transceiver 2430 may be configured to perform all sending operations and receiving operations performed by the main control unit in the embodiment shown in FIG. 15. For example, when a sending operation is performed, it may be considered that the transceiver 2430 is a transmitter; when a receiving operation is performed, it may be considered that the transceiver 2430 is a receiver. Alternatively, the transceiver 2430 may be a general term of two function units, and the two function units are a transmitter and a receiver. The transmitter is configured to implement a sending operation. For example, the transmitter may be configured to perform all the sending operations performed by the main control unit in the embodiment shown in FIG. 15. The receiver is configured to implement a receiving operation. For example, the receiver may be configured to perform all the receiving operations performed by the main control unit in the embodiment shown in FIG. 15.

It should be understood that the communication apparatus 2300 or the communication apparatus 2400 in embodiments of this application may implement the function of the main control unit in the embodiment shown in FIG. 15, and operations and/or functions of the modules in the communication apparatus 2300 or the communication apparatus 2400 are intended to implement corresponding procedures in the embodiment shown in FIG. 15. For brevity, details are not described herein again.

Figure 25:
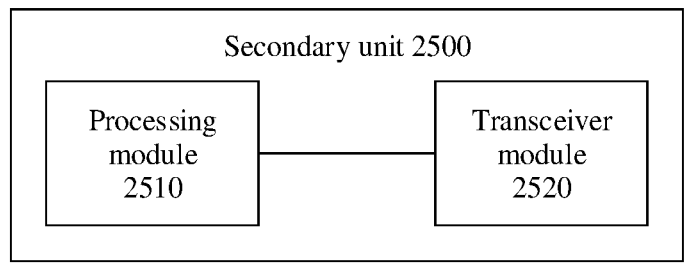
FIG. 25 is a schematic block diagram of a second secondary unit according to an embodiment of this application.

FIG. 25 is a schematic block diagram of a communication apparatus 2500 according to an embodiment of this application. For example, the communication apparatus 2500 is, for example, a secondary unit 2500. Alternatively, the communication apparatus 2500 is, for example, a chip in a communication device, or a combined device or a component that has the function of the secondary unit in the communication device. For example, the communication device 2500 is a secondary unit 2500.

The secondary unit 2500 includes a processing module 2510. Optionally, the secondary unit 2500 may further include a transceiver module 2520. When the secondary unit 2500 is a network device, the transceiver module 2520 may be a transceiver, and may include an antenna, a radio frequency circuit, and the like, and the processing module 2510 may be a processor, for example, a baseband processor. The baseband processor may include one or more central processing units (CPU). When the communication apparatus 2500 is a component having the function of the terminal, the transceiver module 2520 may be a radio frequency unit, and the processing module 2510 may be a processor, for example, a baseband processor. When the secondary unit 2500 is a chip system, the transceiver module 2520 may be an input/output interface of the chip system (for example, a baseband chip), and the processing module may be a processor of the chip system, and may include one or more central processing units.

The processing module 2510 may be configured to perform all operations performed by the secondary unit in the embodiment shown in FIG. 15 other than sending and receiving operations, for example, determine first time information, and/or configured to support another process of the technology described in this specification. The transceiver module 2520 may be configured to perform all sending and receiving operations performed by the secondary unit in the embodiment shown in FIG. 15, for example, step 1500, and/or configured to support another process of the technology described in this specification.

In addition, the transceiver module 2520 may be one function module, and the function module can implement both a sending operation and a receiving operation. For example, the transceiver module 2520 may be configured to perform all sending operations and receiving operations performed by the secondary unit in the embodiment shown in FIG. 15. For example, when a sending operation is performed, it may be considered that the transceiver module 2520 is a sending module; when a receiving operation is performed, it may be considered that the transceiver module 2520 is a receiving module. Alternatively, the transceiver module 2520 may be a general term of two function modules, and the two function modules are a sending module and a receiving module. The sending module is configured to implement a sending operation. For example, the sending module may be configured to perform all the sending operations performed by the secondary unit in the embodiment shown in FIG. 15. The receiving module is configured to implement a receiving operation. For example, the receiving module may be configured to perform all the receiving operations performed by the secondary unit in the embodiment shown in FIG. 15.

For example, the processing module 2510 is configured to control the transceiver module 2520 to receive first data packets from a core network device and indication information that is sent by a main control unit and send first data to a terminal at sending time.

In an optional implementation, the transceiver module 2520 is configured to: receive the first data packets from the core network device and the indication information that is sent by the main control unit, where the first data packets include the first data, the indication information is used to indicate a correspondence between numbers of the first data packets and first time information of the first data packets, and the first time information is used to indicate the sending time of the first data; and send the first data to the terminal at the sending time.

In an optional implementation, the transceiver module 2520 is further configured to receive first configuration information sent by the main control unit, where the first configuration information is used to configure a first time domain resource, and the sending time of the first data is included in the first time domain resource.

In an optional implementation, the first configuration information further includes second time information, and the second time information is used to indicate release time of a first frequency domain resource corresponding to the first time domain resource.

In an optional implementation, the transceiver module 2520 may be specifically configured to receive grant information that is sent by the main control unit and that includes second frequency domain resource information, where the second frequency domain resource information is used to indicate a frequency domain resource corresponding to the first data.

In an optional implementation, the transceiver module 2520 is further configured to: receive concatenation indication information sent by the main control unit, where the concatenation indication information is used to indicate that the first data packet and at least one fourth data packet are concatenated, the at least one fourth data packet includes at least one piece of second data, and the sending time of the first data is the same as sending time of the at least one piece of second data; and send the first data to the terminal at the sending time after concatenating the second data packet and the at least one fourth data packet according to the concatenation indication.

In an optional implementation, the first time information is used to indicate sending time of the first MAC PDU corresponding to the first data packet.

In an optional implementation, the first time information includes a frame number of a radio frame and a slot number; or the first time information is a number of the first time-frequency resource.

It should be understood that the processing module 2510 in this embodiment of this application may be implemented by a processor or a processor-related circuit component, and the transceiver module 2520 may be implemented by a transceiver or a transceiver-related circuit component.

Figure 26:
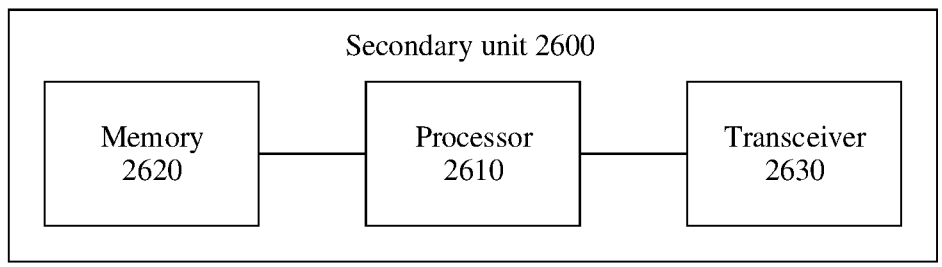
FIG. 26 is another schematic block diagram of a second secondary unit according to an embodiment of this application.

As shown in FIG. 26, an embodiment of this application further provides a communication apparatus 2600. For example, the communication apparatus 2600 is, for example, a secondary unit 2600. Alternatively, the communication apparatus 2600 is, for example, a chip in a communication device, or a combined device or a component that has the function of the secondary unit in the communication device. For example, the communication device is, for example, a secondary unit, or may be a chip system. The communication apparatus 2600 includes a processor 2610, a memory 2620, and a transceiver 2630. The memory 2620 stores instructions or a program. The processor 2610 is configured to execute the instructions or the program stored in the memory 2620. When the instructions or the program stored in the memory 2620 is executed, the processor 2610 is configured to perform the operations performed by the processing module 2510 in the foregoing embodiment, and the transceiver 2630 is configured to perform the operations performed by the transceiver module 2520 in the foregoing embodiment.

The transceiver 2630 may be one function unit, and the function unit can implement both a sending operation and a receiving operation. For example, the transceiver 2630 may be configured to perform all sending operations and receiving operations performed by the secondary unit in the embodiment shown in FIG. 15. For example, when a sending operation is performed, it may be considered that the transceiver 2630 is a transmitter; when a receiving operation is performed, it may be considered that the transceiver 2630 is a receiver. Alternatively, the transceiver 2630 may be a general term of two function units, and the two function units are a transmitter and a receiver. The transmitter is configured to implement a sending operation. For example, the transmitter may be configured to perform all the sending operations performed by the secondary unit in the embodiment shown in FIG. 15. The receiver is configured to implement a receiving operation. For example, the receiver may be configured to perform all the receiving operations performed by the secondary unit in the embodiment shown in FIG. 15.

It should be understood that the communication apparatus 2500 or the communication apparatus 2600 in embodiments of this application may implement the function of the secondary unit in the embodiment shown in FIG. 15, and operations and/or functions of the modules in the communication apparatus 2500 or the communication apparatus 2600 are intended to implement corresponding procedures in the embodiment shown in FIG. 15. For brevity, details are not described herein again.

Figure 27:
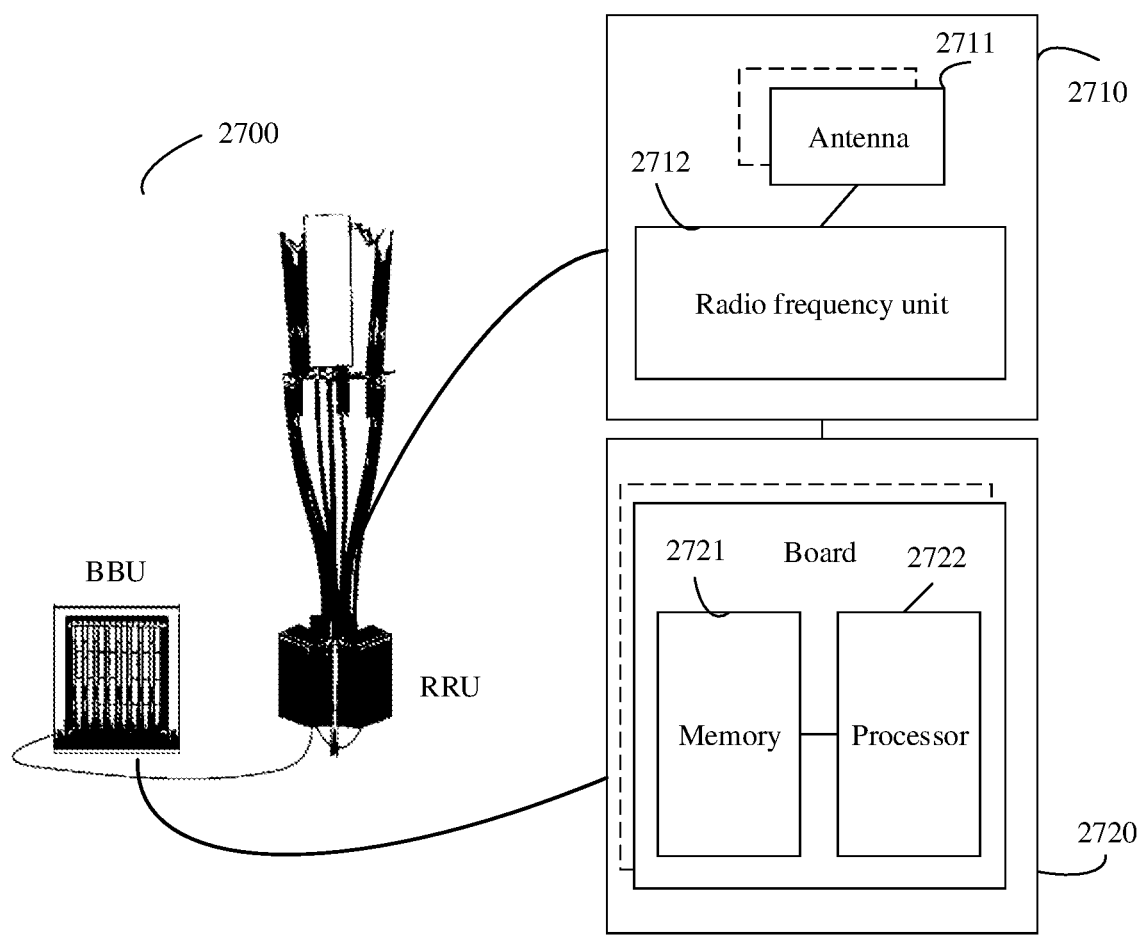
FIG. 27 is a schematic diagram 1 of a structure of a network device according to an embodiment of this application.

FIG. 27 is a schematic diagram of a structure of a network device according to an embodiment of this application. For example, FIG. 27 may be a schematic diagram of a structure of a base station. As shown in FIG. 27, the base station may be applied to the system shown in FIG. 6 to perform the function of the main control unit in the foregoing method embodiment, or the base station may be applied to the system shown in FIG. 15 to perform the function of the main control unit in the foregoing method embodiment. The base station 2700 includes one or more radio frequency units such as a remote radio unit (RRU) 2710 and one or more baseband units (BBU) (which may also be referred to as a digital unit (DU)) 2720. The RRU 2710 may be referred to as a transceiver module, and corresponds to the transceiver module 1910 in FIG. 19, or may correspond to the transceiver module 2310 in FIG. 23. Optionally, the transceiver module may also be referred to as a transceiver, a transceiver circuit, a transceiver, or the like, and may include at least one antenna 2711 and a radio frequency unit 2712. The RRU 2710 is mainly configured to send and receive a radio frequency signal, and perform conversion between the radio frequency signal and a baseband signal. For example, the RRU 2710 is configured to send indication information to a terminal device. The BBU 2720 is mainly configured to perform baseband processing, control a base station, and so on. The RRU 2710 and the BBU 2720 may be physically disposed together, or may be physically separated, that is, the base station is a distributed base station.

The BBU 2720 is a control center of the base station, and may also be referred to as a processing module. The BBU 2720 may correspond to the processing module 1920 in FIG. 19, or may correspond to the processing module 2320 in FIG. 23. The BBU 2720 is mainly configured to implement a baseband processing function such as channel coding, multiplexing, modulation, or spreading. For example, the BBU 2720 (the processing module) may be configured to control the base station to perform an operation procedure related to the main control unit in the foregoing method embodiments, for example, generate the foregoing indication information and the concatenation indication information.

In an example, the BBU 2720 may include one or more boards, and a plurality of boards may jointly support a radio access network (for example, an LTE network) having a single access standard, or may separately support radio access networks (for example, the LTE network, a 5G network, or another network) having different access standards. The BBU 2720 further includes a memory 2721 and a processor 2722. The memory 2721 is configured to store necessary instructions and data. The processor 2722 is configured to control the base station to perform a necessary action, for example, configured to control the base station to perform the operation procedure related to the main control unit in the foregoing method embodiments. The memory 2721 and the processor 2722 may serve one or more boards. In other words, the memory and the processor may be separately disposed on each board. Alternatively, the plurality of boards may share a same memory and processor. In addition, a necessary circuit may be further disposed on each board.

Figure 28:
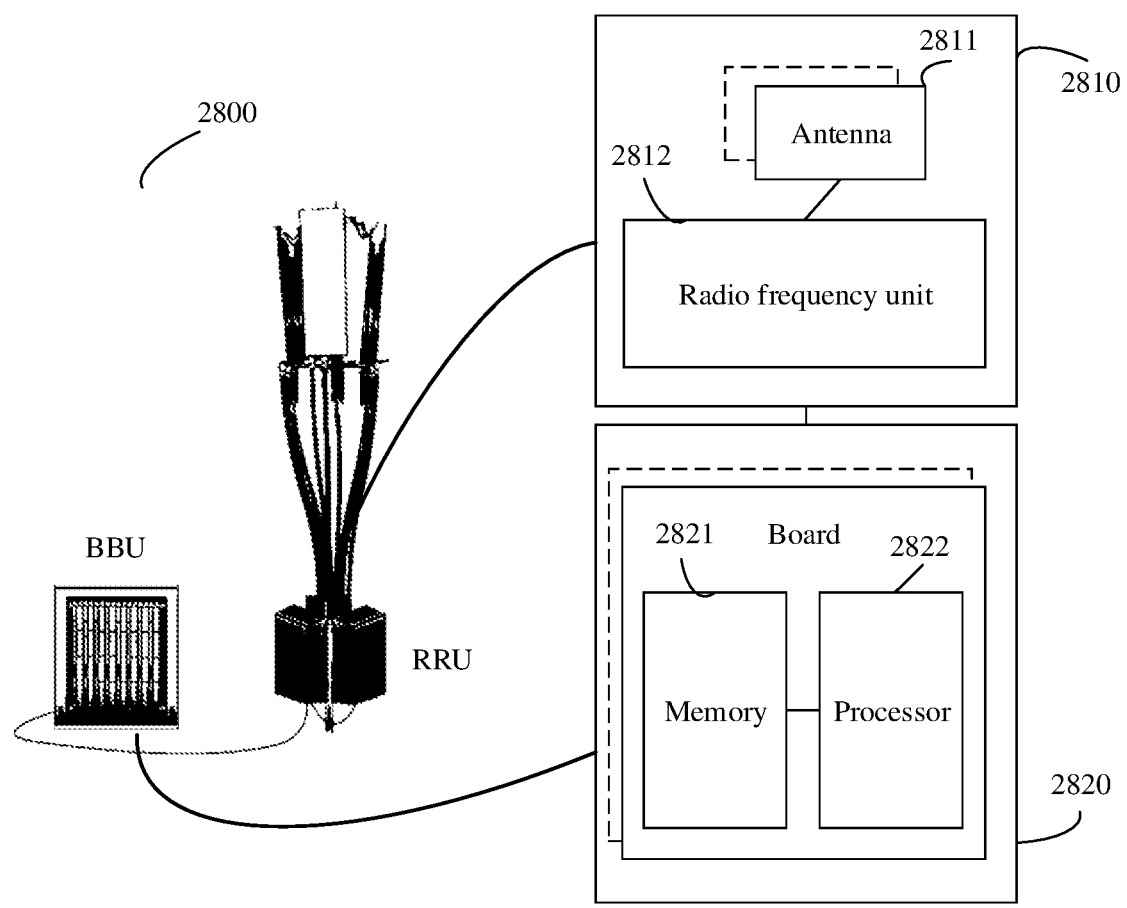
FIG. 28 is a schematic diagram 1 of a structure of a network device according to an embodiment of this application.

FIG. 28 is a schematic diagram of a structure of a network device according to an embodiment of this application. For example, FIG. 28 may be a schematic diagram of a structure of a base station. As shown in FIG. 28, the base station may be applied to the system shown in FIG. 6 to perform the function of the secondary unit in the foregoing method embodiment, or the base station may be applied to the system shown in FIG. 15 to perform the function of the secondary unit in the foregoing method embodiment. The base station 2800 includes one or more radio frequency units such as a remote radio unit (RRU) 2810 and one or more baseband units (BBU) (which may also be referred to as a digital unit (DU)) 2820. The RRU 2810 may be referred to as a transceiver module, and corresponds to the transceiver module 2010 in FIG. 20, or may correspond to the transceiver module 2410 in FIG. 24. Optionally, the transceiver module may also be referred to as a transceiver, a transceiver circuit, a transceiver, or the like, and may include at least one antenna 2811 and a radio frequency unit 2812. The RRU 2810 is mainly configured to send and receive a radio frequency signal, and perform conversion between the radio frequency signal and a baseband signal. For example, the RRU 2810 is configured to send indication information to a terminal device. The BBU 2820 is mainly configured to perform baseband processing, control a base station, and so on. The RRU 2810 and the BBU 2820 may be physically disposed together, or may be physically separated, that is, the base station is a distributed base station.

The BBU 2820 is a control center of the base station, and may also be referred to as a processing module. The BBU 2820 may correspond to the processing module 2020 in FIG. 20, or may correspond to the processing module 2420 in FIG. 24. The BBU 2820 is mainly configured to implement a baseband processing function such as channel coding, multiplexing, modulation, or spreading. For example, the BBU 2820 (the processing module) may be configured to control the base station to perform an operation procedure related to the secondary unit in the foregoing method embodiments, for example, control the radio frequency unit to send the first data on the first time domain resource corresponding to the sending time indicated by the first time information.

In an example, the BBU 2820 may include one or more boards, and a plurality of boards may jointly support a radio access network (for example, an LTE network) having a single access standard, or may separately support radio access networks (for example, the LTE network, a 5G network, or another network) having different access standards. The BBU 2820 further includes a memory 2821 and a processor 2822. The memory 2821 is configured to store necessary instructions and data. The processor 2822 is configured to control the base station to perform a necessary action, for example, configured to control the base station to perform the operation procedure related to the secondary unit in the foregoing method embodiments. The memory 2821 and the processor 2822 may serve one or more boards. In other words, the memory and the processor may be separately disposed on each board. Alternatively, the plurality of boards may share a same memory and processor. In addition, a necessary circuit may be further disposed on each board.

Figure 29:
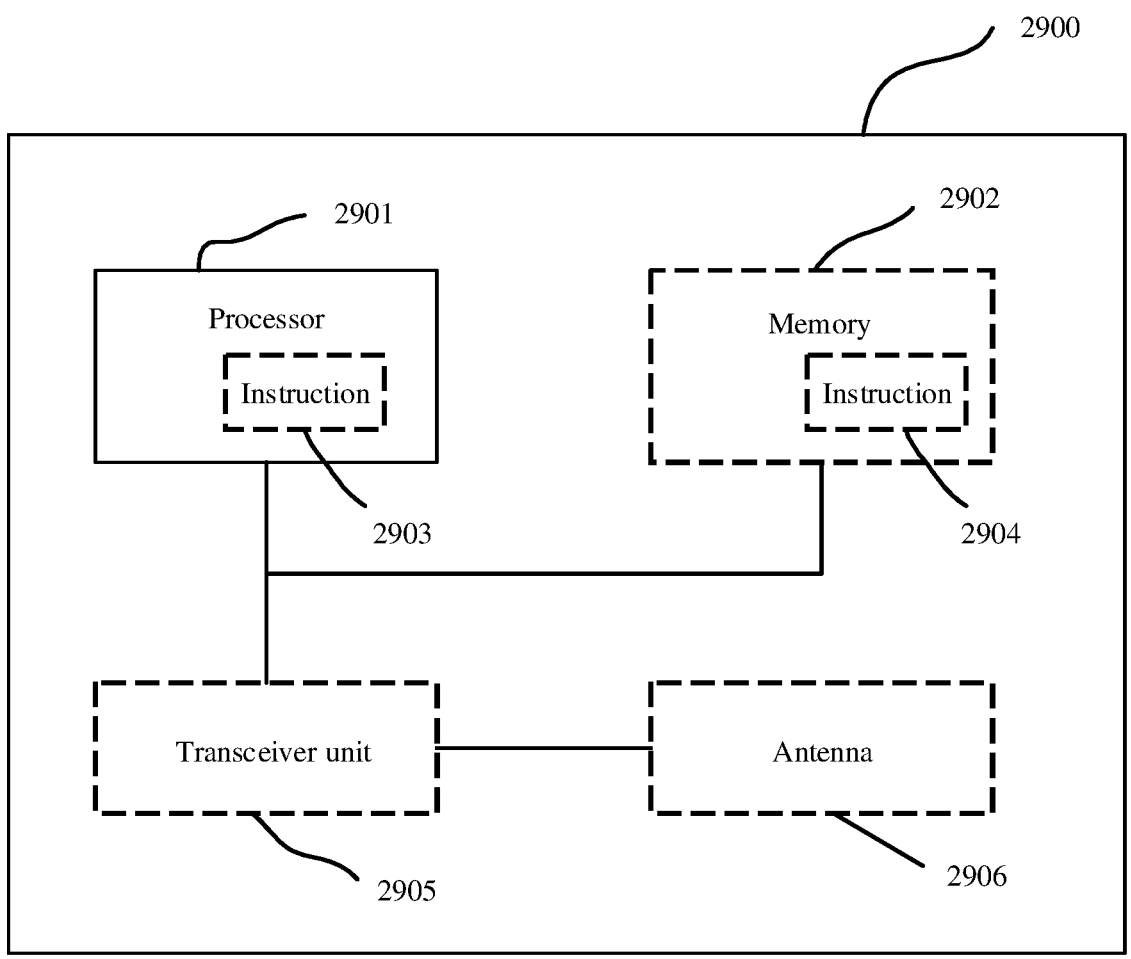
FIG. 29 is a schematic diagram of a structure of a communication apparatus according to an embodiment of this application.

FIG. 29 is a schematic diagram of a structure of a communication apparatus 2900. The apparatus 2900 may be configured to implement the method described in the foregoing method embodiment. Refer to the description in the foregoing method embodiment. The communication apparatus 2900 may be a chip, a network device (for example, a base station), a terminal device, another network device, or the like.

The communication apparatus 2900 includes one or more processors 2901. The processor 2901 may be a general purpose processor, a dedicated processor, or the like. For example, the processor may be a baseband processor or a central processing unit. The baseband processor may be configured to process a communication protocol and communication data. The central processing unit may be configured to control the communication apparatus (for example, a base station, a terminal, or a chip), execute a software program, and process data of the software program. The communication apparatus may include a transceiver unit that is configured to input (receive) and output (send) a signal. For example, the communication apparatus may be a chip, and the transceiver unit may be an input and/or output circuit or a communication interface of the chip. The chip may be used for a terminal, a base station, or another network device. For another example, the communication apparatus may be a terminal, a base station, or another network device, and the transceiver unit may be a transceiver, a radio frequency chip, or the like.

The communication apparatus 2900 includes one or more processors 2901. The one or more processors 2901 may implement the method of the main control unit or the distributed unit in the embodiment shown in FIG. 6, or the one or more processors 2901 may implement the method of the main control unit or the distributed unit in the embodiment shown in FIG. 15.

In a possible design, the communication apparatus 2900 includes a means configured to generate first time information and a means configured to send first data and the first time information. Functions of the means for generating the first time information and sending the first time information may be implemented by using one or more processors. For example, the first time information may be generated by using the one or more processors, and the first data and the first time information may be sent by using a transceiver, an input/output circuit, or an interface of a chip. For the first time information, refer to related descriptions in the foregoing method embodiments.

In a possible design, the communication apparatus 2900 includes a means configured to receive the first data and the first time information and a means configured to send the first data based on the first time information. For the first time information and how to send the first data based on the first time information, refer to related descriptions in the foregoing method embodiments. For example, the first time information may be received by using a transceiver, an input/output circuit, or an interface of a chip, and the first data is sent based on the first time information by using one or more processors.

In a possible design, the communication apparatus 2900 includes a means configured to generate indication information and a means configured to send the indication information. One or more processors may be used to implement functions of the means for generating the indication information and the means for sending the indication information. For example, the indication information may be generated by using the one or more processors, and the indication information may be sent by using a transceiver, an input/output circuit, or an interface of a chip. For the indication information, refer to related descriptions in the foregoing method embodiments.

In a possible design, the communication apparatus 2900 includes a means for receiving indication information and a means for sending first data based on the indication information. For the indication information and how to send the first data based on the indication information, refer to related descriptions in the foregoing method embodiments. For example, the indication information may be received by using a transceiver, an input/output circuit, or an interface of a chip, and the first data is sent based on the indication information by using one or more processors.

Optionally, the processor 2901 may further implement another function in addition to the method in the embodiment shown in FIG. 6 or FIG. 15.

Optionally, in a design, the processor 2901 may execute instructions, so that the communication apparatus 2900 performs the method described in the foregoing method embodiment. All or a part of the instructions, for example, an instruction 2903, may be stored in the processor. Alternatively, all or a part of the instructions, for example, an instruction 2904, may be stored in a memory 2902 coupled to the processor. Alternatively, the communication apparatus 2900 may be enabled, by using both instructions 2903 and 2904, to perform the method described in the foregoing method embodiment.

In another possible design, the communication apparatus 2900 may alternatively include a circuit. The circuit may implement a function of the main control unit or the distributed unit in the foregoing method embodiment.

In another possible design, the communication apparatus 2900 may include one or more memories 2902. The memory stores an instruction 2904. The instruction may be run on the processor, so that the communication apparatus 2900 performs the method described in the foregoing method embodiment. Optionally, the memory may further store data. Optionally, the processor may also store instructions and/or data. For example, the one or more memories 2902 may store the correspondence between the numbers of the data packets and the first time information described in the foregoing embodiment. The processor and the memory may be separately disposed, or may be integrated together.

In another possible design, the communication apparatus 2900 may further include a transceiver unit 2905 and an antenna 2906. The processor 2901 may be referred to as a processing unit, and controls the communication apparatus 2900 (a terminal or a base station). The transceiver unit 2905 may be referred to as a transceiver, a transceiver circuit, a transceiver, or the like, and is configured to implement a transceiver function of the communication apparatus by using the antenna 2906.

This application further provides a communication system, including the foregoing one or more network devices and one or more terminal devices.

It should be noted that the processor in embodiments of this application may be an integrated circuit chip, and has a signal processing capability. In the implementation process, the steps in the foregoing method embodiment may be completed by using a hardware integrated logic circuit in the processor or by using instructions in a form of software. The processor may be a general purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware in the processor.

It may be understood that, in embodiments of this application, the memory may be a volatile memory or a nonvolatile memory, or may include both a volatile memory and a nonvolatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the system and method described in this specification includes but is not limited to these and any memory of another appropriate type.

An embodiment of this application further provides a computer-readable medium. The computer-readable medium stores a computer program. When the computer program is executed by a computer, the communication method in any one of the foregoing method embodiments is implemented.

An embodiment of this application further provides a computer program product. When the computer program product is executed by a computer, the communication method in any one of the foregoing method embodiments is implemented.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any available medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

An embodiment of this application further provides a processing apparatus, including a processor and an interface. The processor is configured to perform the communication method in any one of the foregoing method embodiments.

It should be understood that the processing apparatus may be a chip. The processor may be implemented by using hardware, or may be implemented by using software. When implemented by using the hardware, the processor may be a logic circuit, an integrated circuit, or the like. When implemented by using the software, the processor may be a general purpose processor. The general purpose processor is implemented by reading software code stored in a memory. The memory may be integrated into the processor, may be located outside the processor, or may exist independently.

It should be understood that "one embodiment" or "an embodiment" mentioned in the entire specification means that particular features, structures, or characteristics related to embodiments are included in at least one embodiment of this application. Therefore, "in one embodiment" or "in an embodiment" appearing in the entire specification does not necessarily refer to a same embodiment. In addition, the particular features, structures, or characteristics may be combined in one or more embodiments by using any appropriate manner. It should be understood that, in embodiments of this application, sequence numbers of the foregoing processes do not mean execution sequences. The execution sequences of the processes should be determined based on functions and internal logic of the processes, and should not constitute any limitation to implementation processes of embodiments of this application.

In addition, the terms "system" and "network" are usually used interchangeably in this specification. The term "and/or" in this specification describes only an association relationship between associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that, in embodiments of this application, "B corresponding to A" indicates that B is associated with A, and B may be determined based on A. However, it should be further understood that determining B based on A does not mean that B is determined based only on A. B may alternatively be determined based on A and/or other information.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a specific working process of the foregoing system, apparatus, and unit, refer to a corresponding process in the method embodiment. Details are not described herein again.

In the several embodiments provided in this application, it should be understood that the disclosed system, apparatus, and method may be implemented in other manners. For example, the foregoing apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments of this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

With descriptions of the foregoing implementations, a person skilled in the art may clearly understand that this application may be implemented by hardware, firmware, or a combination thereof. When this application is implemented by software, the foregoing functions may be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium may be any available medium accessible to a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can be used to carry or store expected program code in a form of instructions or a data structure and can be accessed by the computer. In addition, any connection may be properly defined as a computer-readable medium. For example, if software is transmitted from a website, a server, or another remote source by using a coaxial cable, an optical fiber/cable, a twisted pair, a digital subscriber line (DSL), or wireless technologies such as infrared ray, radio, and microwave, the coaxial cable, optical fiber/cable, twisted pair, DSL, or wireless technologies such as infrared ray, radio, and microwave are included in fixation of a medium to which they belong. A disk and a disc used in this application include a compact disc (CD), a laser disc, an optical disc, a digital versatile disc (DVD), a floppy disk, and a Blu-ray disc, where the disk generally copies data in a magnetic manner, and the disc copies data optically in a laser manner. The foregoing combination shall also be included in the protection scope of the computer-readable medium.

In summary, what is described above is merely example embodiments of the technical solutions of this application, but is not intended to limit the protection scope of this application. Any modification, equivalent replacement, or improvement made without departing from the spirit and the principle of this application shall fall within the protection scope of this application.

What is claimed is:

1. A communication method, comprising:
receiving, at a main control unit, a first data packet from a core network device, wherein the first data packet comprises first data; and sending the first data and first time information to at least one secondary unit, wherein the first time information indicates a sending time at which the first data is to be sent by the at least one secondary unit to a terminal, and wherein the first time information is determined based on a time domain resource of the main control unit or a time domain resource of the at least one secondary unit, and no SYNC protocol entity is used to add a time stamp to the first data;

wherein sending the first data to the at least one secondary unit comprises:
sending a second data packet to the at least one secondary unit, wherein the second data packet comprises the first data, and the second data packet is obtained by processing the first data packet; and wherein the method further comprises:
sending concatenation indication information to the at least one secondary unit, wherein the concatenation indication information indicates that the second data packet and at least one fourth data packet are concatenated, the at least one fourth data packet comprises at least one piece of second data, and the sending time of the first data is same as a sending time of the at least one piece of second data.

2. The method according to claim 1, wherein the second data packet comprises a packet data convergence protocol protocol data unit (PDCP PDU).

3. The method according to claim 2, wherein sending the first data and the first time information to the at least one secondary unit comprises:
sending, to the at least one secondary unit, grant information comprising second frequency domain resource information, wherein the second frequency domain resource information indicates a frequency domain resource corresponding to the first data.

4. The method according to claim 3, wherein
the grant information comprises at least one piece of second frequency domain resource information, the at least one piece of second frequency domain resource information corresponds to at least one MAC PDU, and the at least one MAC PDU corresponds to the PDCP PDU.

5. The method according to claim 2, wherein
the first time information indicates sending time of a first MAC PDU corresponding to the PDCP PDU.

6. The method according to claim 1, wherein the method further comprises:
sending first configuration information to the at least one secondary unit, wherein the first configuration information configures a first time domain resource, and the sending time is comprised in the first time domain resource.

7. The method according to claim 6, wherein the first configuration information further comprises second time information, and the second time information indicates release time of a first frequency domain resource corresponding to the first time domain resource.

8. The method according to claim 6, wherein the first time information comprises a frame number of a radio frame and a slot number; or the first time information is a number of the first time domain resource.

9. A communication method, comprising:
receiving, at a secondary unit, first data and first time information that are sent by a main control unit, wherein the first time information indicates a sending time at which the first data is to be sent to a terminal; and
sending the first data to the terminal at the sending time, wherein the first time information is determined based on a time domain resource of the main control unit or a time domain resource of the secondary unit, and no SYNC protocol entity is used to add a time stamp to the first data;

wherein receiving the first data sent by the main control unit comprises:
receiving a second data packet sent by the main control unit, wherein the second data packet comprises the first data; and wherein the method further comprises:
receiving concatenation indication information sent by the main control unit, wherein the concatenation indication information indicates that the second data packet and at least one fourth data packet are concatenated, the at least one fourth data packet comprises at least one piece of second data, and the sending time of the first data is same as sending time of the at least one piece of second data.

10. The method according to claim 9, wherein the second data packet comprises a packet data convergence protocol protocol data unit (PDCP PDU).

11. The method according to claim 10, wherein receiving the first data sent by the main control unit comprises:
receiving grant information that is sent by the main control unit and that comprises second frequency domain resource information, wherein the second frequency domain resource information indicates a frequency domain resource corresponding to the first data.

12. The method according to claim 11, wherein
the grant information comprises at least one piece of second frequency domain resource information, the at least one piece of second frequency domain resource information corresponds to at least one MAC PDU, and the at least one MAC PDU corresponds to the PDCP PDU.

13. The method according to claim 9, wherein the method further comprises:
receiving first configuration information sent by the main control unit, wherein the first configuration information configures a first time domain resource, and the sending time is comprised in the first time domain resource.

14. The method according to claim 13, wherein the first configuration information further comprises second time information, and the second time information indicates release time of a first frequency domain resource corresponding to the first time domain resource.

15. A communication apparatus, comprising:
at least one non-transitory memory storing a computer program; and
at least one processor coupled to the at least one non-transitory memory, the at least one processor is configured to execute the computer program to cause the communication apparatus to perform:
receiving a first data packet from a core network device, wherein the first data packet comprises first data; and
sending the first data and first time information to at least one secondary unit, wherein the first time information indicates a sending time at which the first data is to be sent by the at least one secondary unit to a terminal, and
wherein the first time information is determined based on a time domain resource of the communication apparatus or a time domain resource of the at least one secondary unit, and no SYNC protocol entity is used to add a time stamp to the first data;

wherein sending the first data to the at least one secondary unit comprises:
  sending a second data packet to the at least one secondary unit, wherein the second data packet comprises the first data, and the second data packet is obtained by processing the first data packet; and
wherein the at least one processor is configured to execute the computer program to cause the communication apparatus to further perform:
  sending concatenation indication information to the at least one secondary unit, wherein the concatenation indication information indicates that the second data packet and at least one fourth data packet are concatenated, the at least one fourth data packet comprises at least one piece of second data, and the sending time of the first data is same as a sending time of the at least one piece of second data.

16. The communication apparatus according to claim 15, wherein the second data packet comprises a packet data convergence protocol protocol data unit (PDCP PDU).

17. The communication apparatus according to claim 16, wherein sending the first data and the first time information to the at least one secondary unit comprises:
  sending, to the at least one secondary unit, grant information comprising second frequency domain resource information, wherein the second frequency domain resource information indicates a frequency domain resource corresponding to the first data.

18. The communication apparatus according to claim 17, wherein
  the grant information comprises at least one piece of second frequency domain resource information, the at least one piece of second frequency domain resource information corresponds to at least one MAC PDU, and the at least one MAC PDU corresponds to the PDCP PDU.

19. The communication apparatus according to claim 16, wherein the first time information indicates sending time of a first MAC PDU corresponding to the PDCP PDU.

20. The communication apparatus according to claim 15, wherein the at least one processor is configured to execute the computer program to cause the communication apparatus to further perform:
  sending first configuration information to the at least one secondary unit, wherein the first configuration information configures a first time domain resource, and the sending time is comprised in the first time domain resource.

* * * * *